Nov. 15, 1960   F. H. BRAY ET AL   2,960,575
AUTOMATIC TELECOMMUNICATION SYSTEMS
Filed Sept. 28, 1954   29 Sheets-Sheet 8

Inventors
F. H. BRAY-
R. G. KNIGHT-
G. C. HARTLEY
By Robert Harding Jr.
Attorney Nov. 15, 1960     F. H. BRAY ET AL     2,960,575
AUTOMATIC TELECOMMUNICATION SYSTEMS
Filed Sept. 28, 1954     29 Sheets-Sheet 16

Inventors
F. H. BRAY
R. G. KNIGHT
G. C. HARTLEY
By Robert Hardigh
Attorney

Metering Control Pulses

| Pulse № | Pulse Function |
|---|---|
| 13 to 112 | Sub's Line Pulses (PL) 100 lines +ve |
| 141 to 240 | Final Control Test Pulses (PFT) 100 lines +ve |
| 114 to 133<br>242 to 5 | Register Hunter Outlet Test Pulses (RH) -ve |
| 13 to 112<br>141 to 240 | Cord Cct. Pulses for associating to Register (PGL) (+ve)<br>100 Cord Ccts. Grp. of 100 Cord Ccts. marked by PG Pulses above |
| 1 to 10<br>129 to 138 | Level Selection Pulses (PS) +ve |
| 11 &<br>139 | End of Selection (PSF) +ve |
| 25 to 34<br>153 to 162 | Outlet Test Pulses (PT) +ve |
| 35 &<br>163 | Outlets Busy Pulse (PB) +ve |
| 241 | Final Control Test Sub Busy Pulse (PBT) +ve |
| 242 | " " " Dead Line N.U. Tone (PNT) +ve |
| 10 &<br>138 | Cord Cct. Release (PSR) +ve |
| 9 &<br>137 | Cord Cct. Reset (PR) +ve |
| 121 &<br>249 | 1st Selector Marking (RL OP^N) & Release of connection between Selector & Register (PM) +ve |
| 122 &<br>250 | Register Guard (PRG) +ve |
| 113 &<br>241 | O/G Call Detector Pulse (POG) +ve |
| 116 &<br>244 | Discrim. Change-over Pulse (PCO) +ve |

*Fig. 29.*

| Pulse Nº | Pulse Function |
|---|---|
| 118 & 246 | Discr. Reset (PDR) +ve |
| 120 & 248 | O/G Call Detector Reset (PDS) +ve |
| 13 to 112, 141 to 240 | Pulses for associating Registers with Call Discrimr. (PRC) +ve |
| 114 & 242 | Release of Register from Call Discrimr. (PRR) |
| 110 & 238 | Register Release (PRL) +ve |
| 36 & 164 | Level Selection Release (PLR) +ve |
| 243 | Final Selector Control Release (PFR) +ve |
| 116 & 244 | Single Fee |
| 117 & 245 | Double Fee — Fee Pulses (PFF) |
| 118 & 246 | Quadruple Fee |
| 134 & 6 | Register Hunter Outlet Test Finish (PRE) +ve; −ve |

Fig. 30.

United States Patent Office 2,960,575
Patented Nov. 15, 1960

2,960,575

AUTOMATIC TELECOMMUNICATION SYSTEMS

Frederick Harry Bray, Ronald George Knight, and George Clifford Hartley, London, England, assignors to International Standard Electric Corporation, New York, N.Y.

Filed Sept. 28, 1954, Ser. No. 458,934

24 Claims. (Cl. 179—18)

The present invention relates to automatic telecommunication systems.

The invention has the following features—

(1) The use of a two wire transmission path for switching, as well as communication purposes; it may also be used for most signalling purposes.

(2) The use of static electric switches controlled by marking principles.

(3) The use of several register-controllers common to all selecting stages, and a single marker circuit at each separate stage.

(4) The use of a common marking multiple for a stage of switches, one switch in the group being operated at a time.

(5) The control of every selecting operation by a predetermined time cycle.

(6) The use of electrical pulse trains for the control of operations of groups of switches having different functions.

(7) The use of an electrical pulse time cycle for control of the operation of a connection-making switch.

(8) The use in an exchange comprising registers of priority arrangements for outgoing connections in which, after selection of an outgoing junction, the register is released and subsequent digits are sent direct over the junction.

(9) Use in a two-wire switching system of multiples for different sub-groups of selector switches at a stage multiplied together via decoupling devices to a common multiple over which the setting of the switches of all the sub-groups is controlled.

(10) The use of a call-queueing system at every selector stage of an exchange.

(11) A common multiple for line finders and final selectors, to which the multiple is offered in intermingled order.

(12) An automatic telecommunication exchange comprising a plurality of selector stages wherein selection at all stages takes place at each stage in synchronism, and only one selection takes place at each stage in a selection time cycle.

The invention will now be described with reference to the accompanying drawings, in which:

Figs. 1 and 2, of which Fig. 2 should be placed to the right of Fig. 1, together show a trunking diagram of a telephone exchange embodying the present invention.

Figure 5:
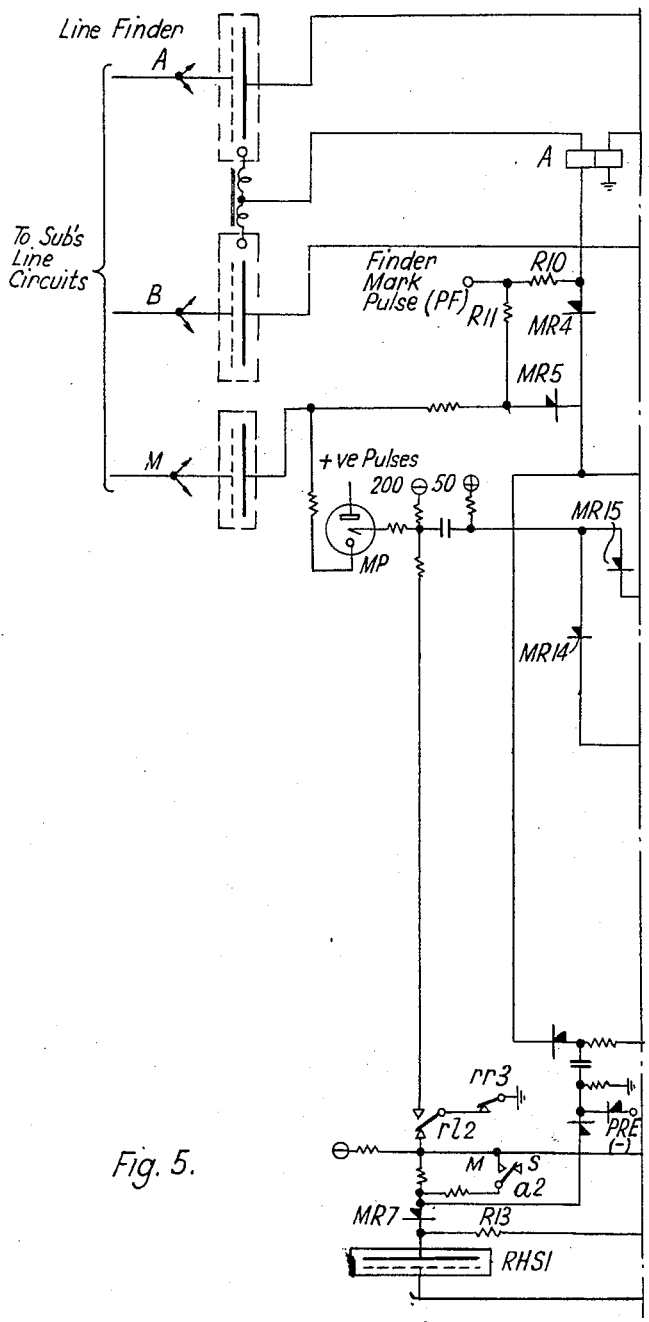
Figure 6:
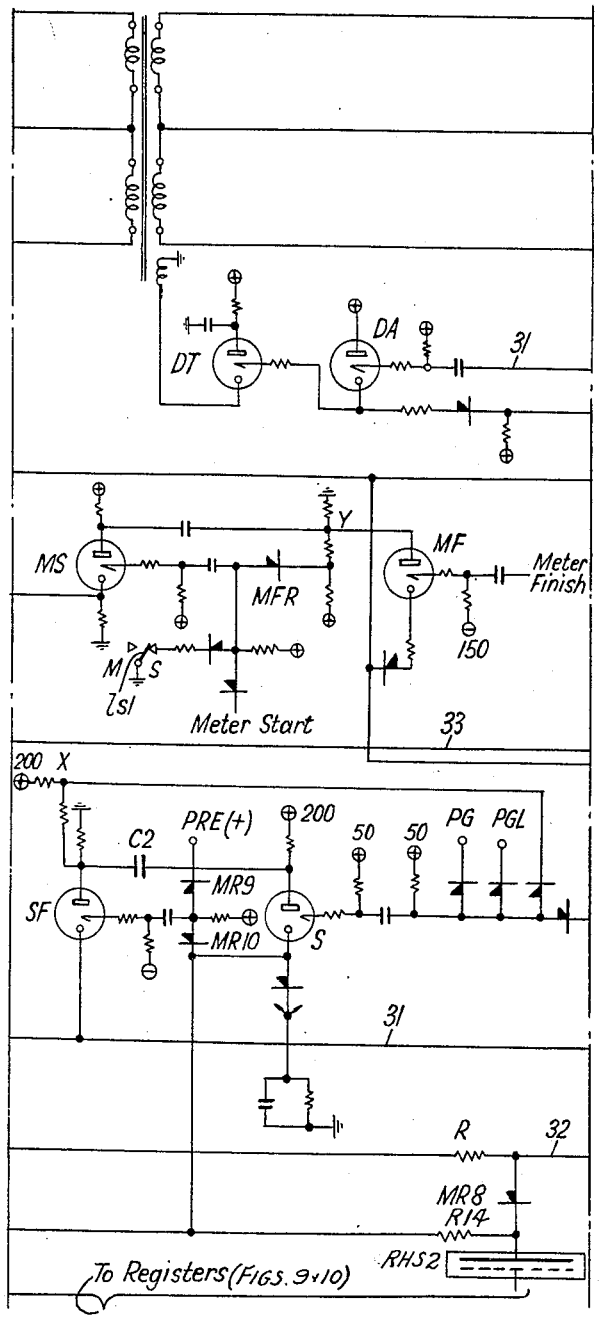
Figure 7:
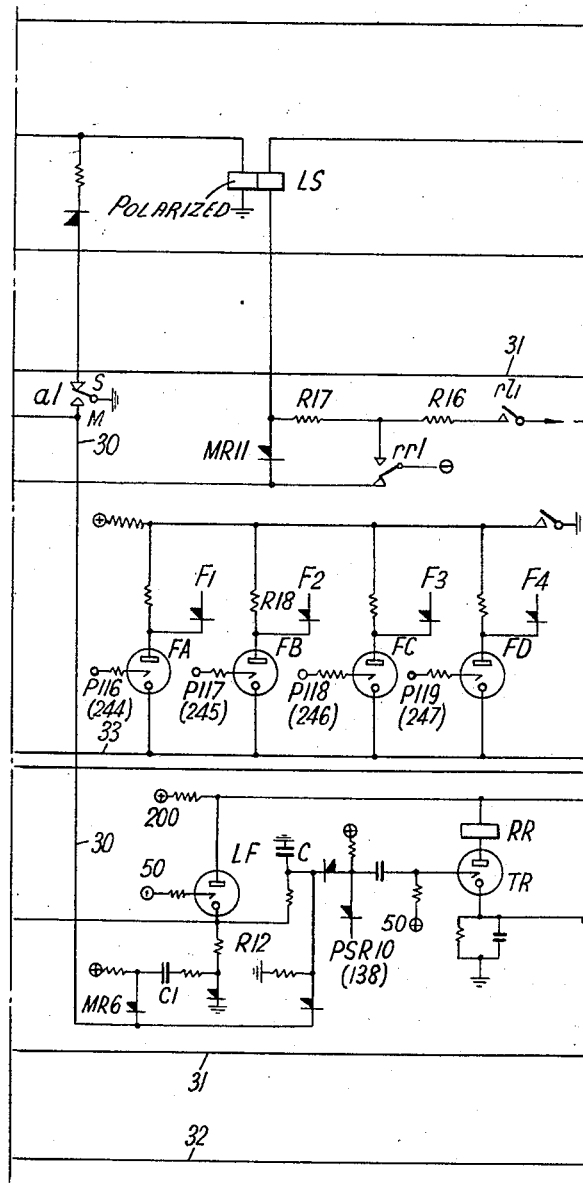
Figure 8:
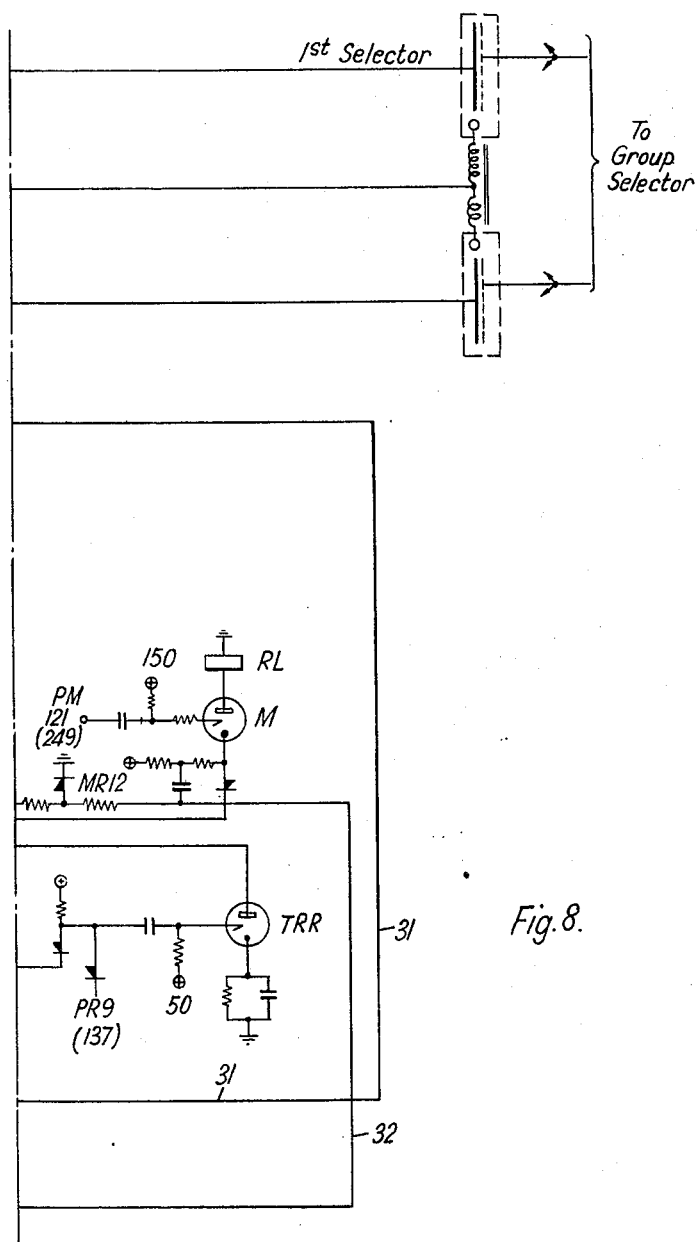
Figure 9:
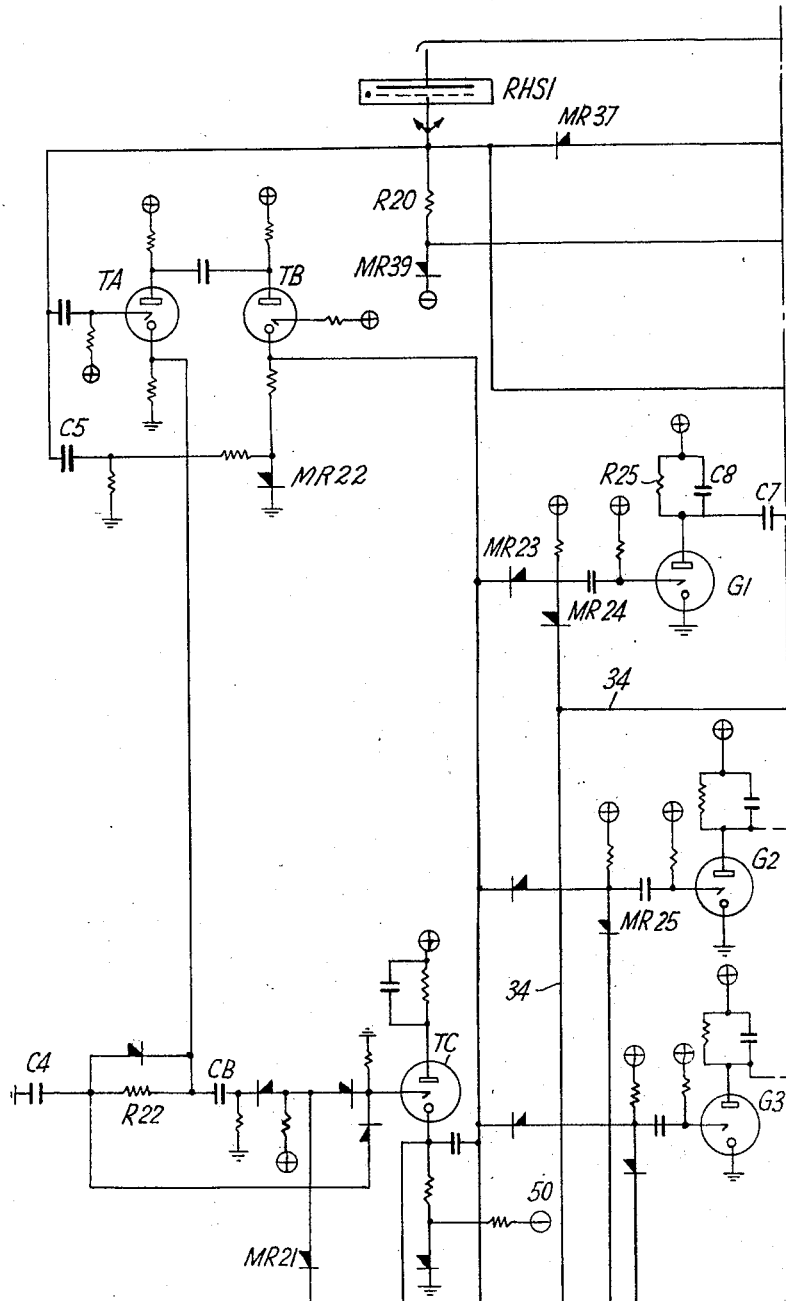
Figure 10:
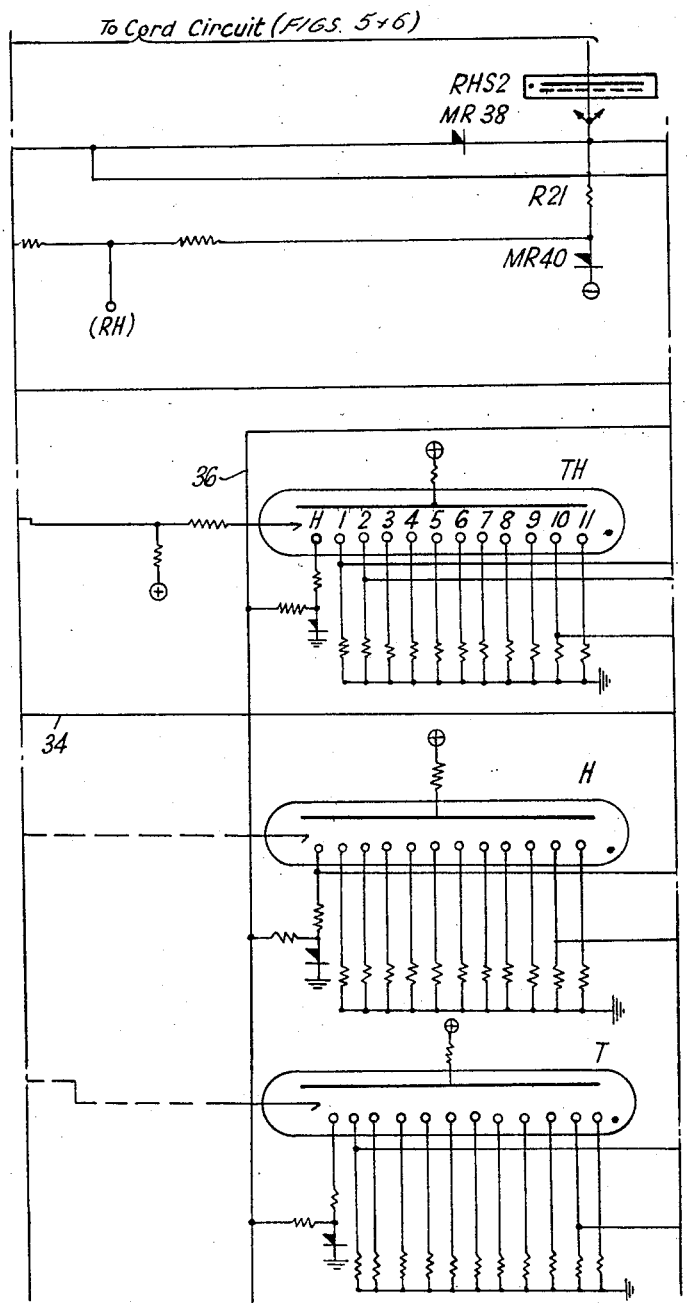
Figure 11:
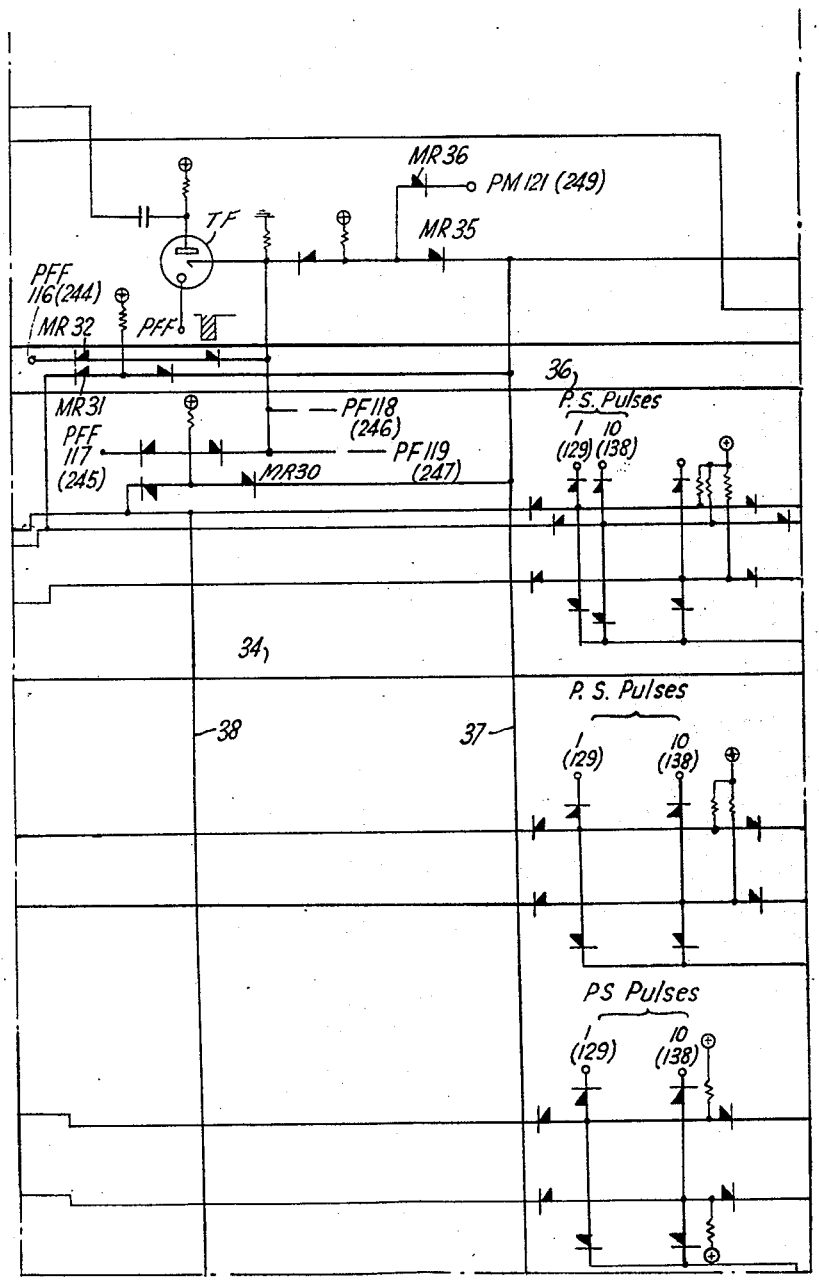
Figure 12:
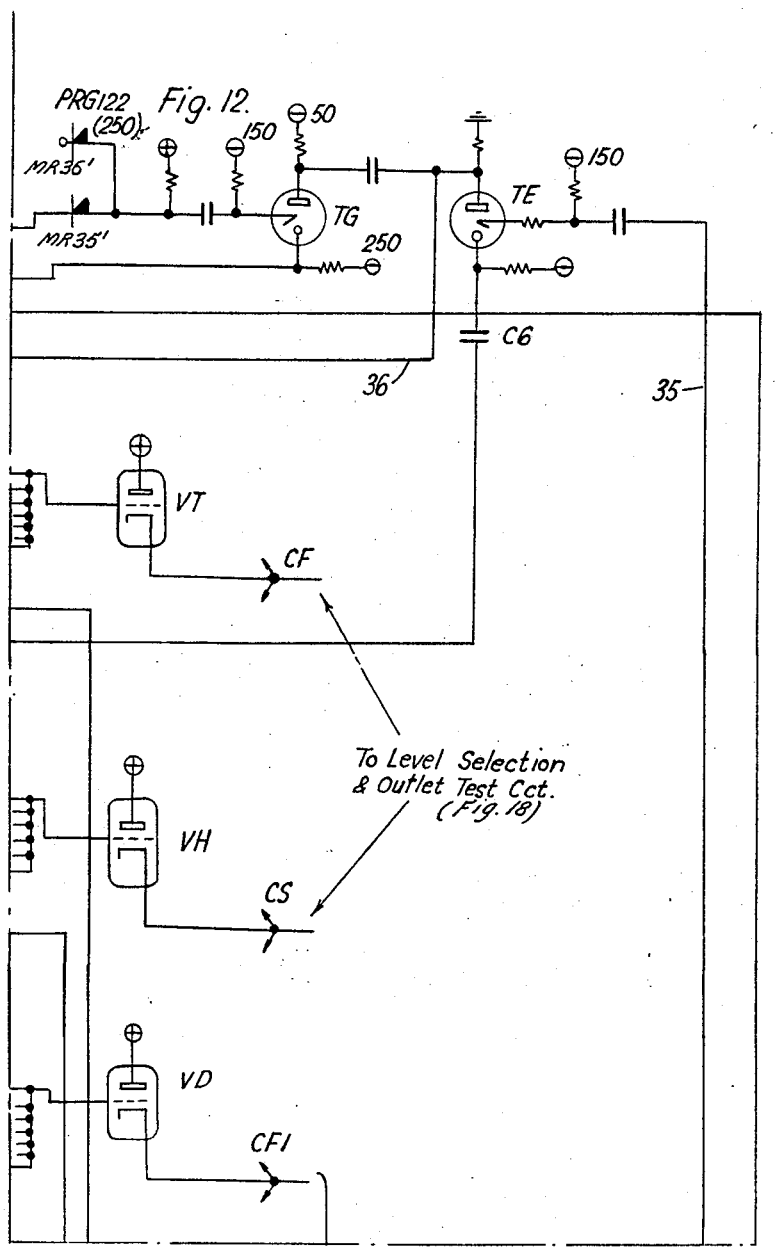
Figure 13:
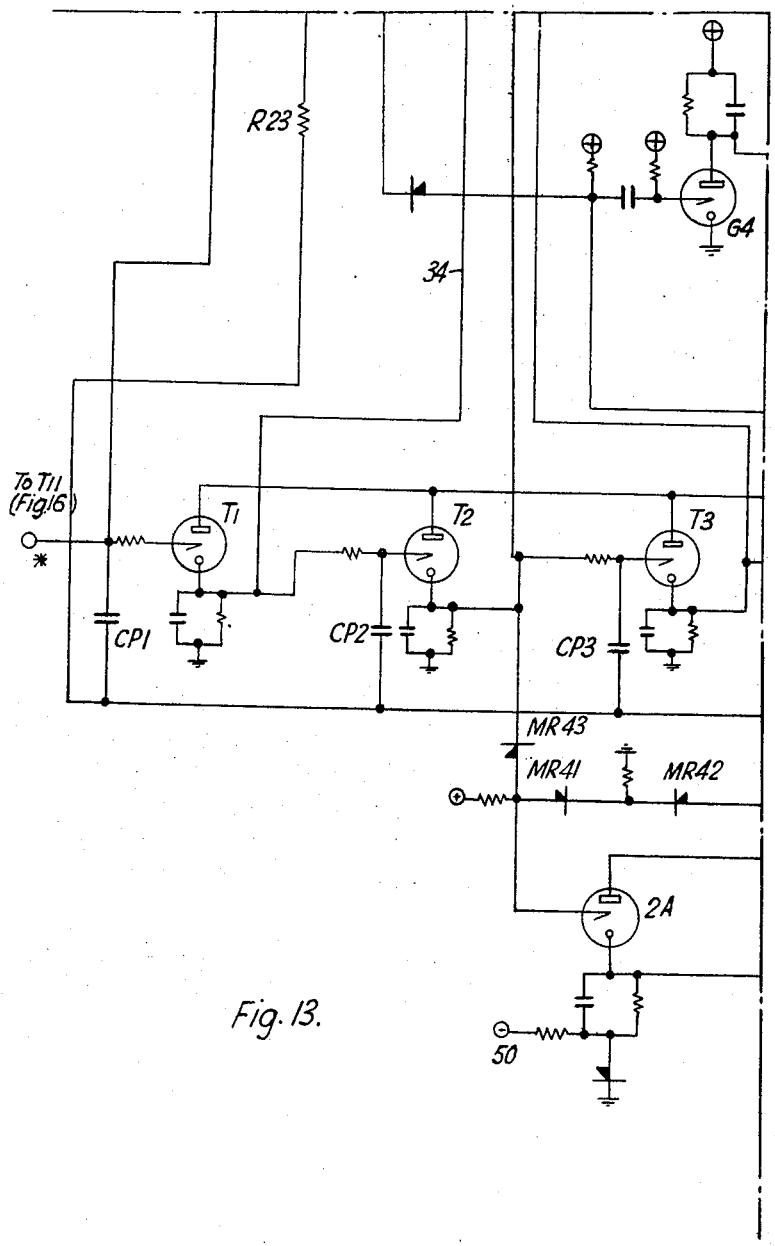

Figs. 5 to 8, which should be assembled with Fig. 6 to the right of Fig. 5, Fig. 7 to the right of Fig. 6 and Fig. 8 to the right of Fig. 7, together show a line-finder first selector cord circuit.

Figs. 9 to 16, which should be assembled as shown in Fig. 31, together show a register.

Figure 17:
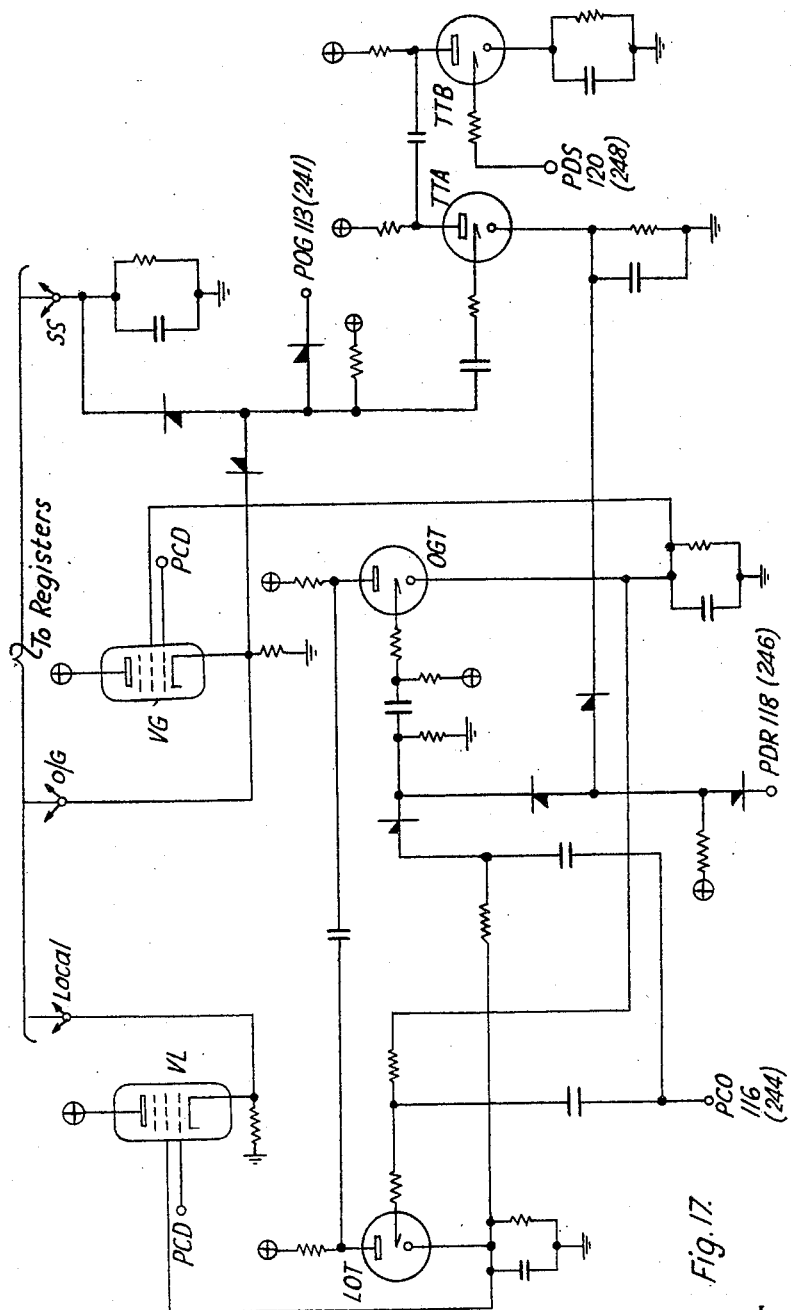

Fig. 17 is the call distributor which serves all registers.

Figure 18:
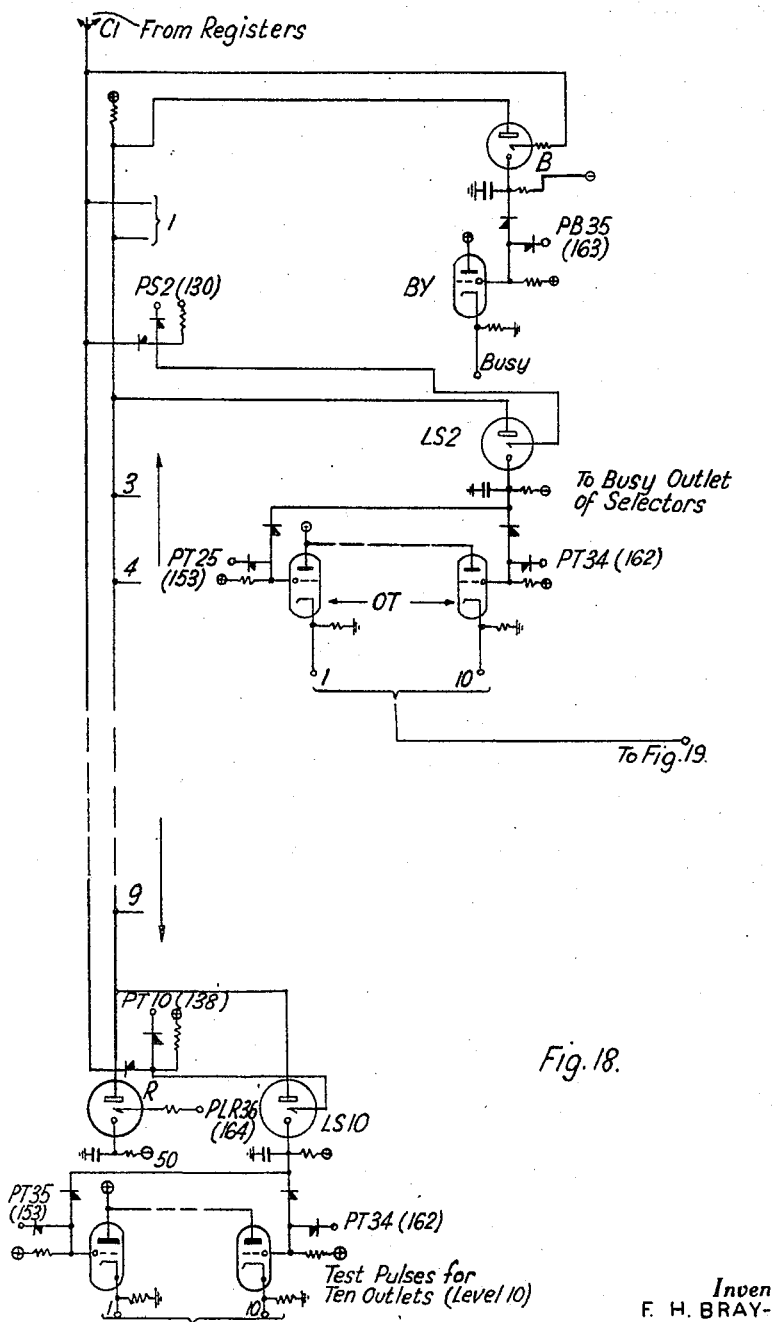
Figure 19:
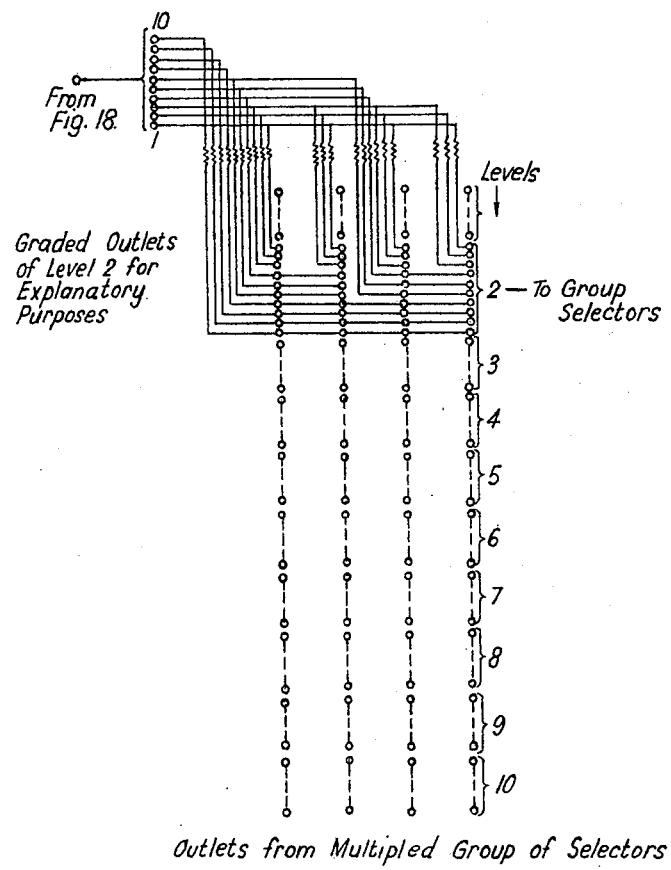

Figs. 18 and 19, of which Fig. 19 should be placed to the right of Fig. 18, together show the level selection and outlet test circuit for a single group selection stage.

Figure 20:
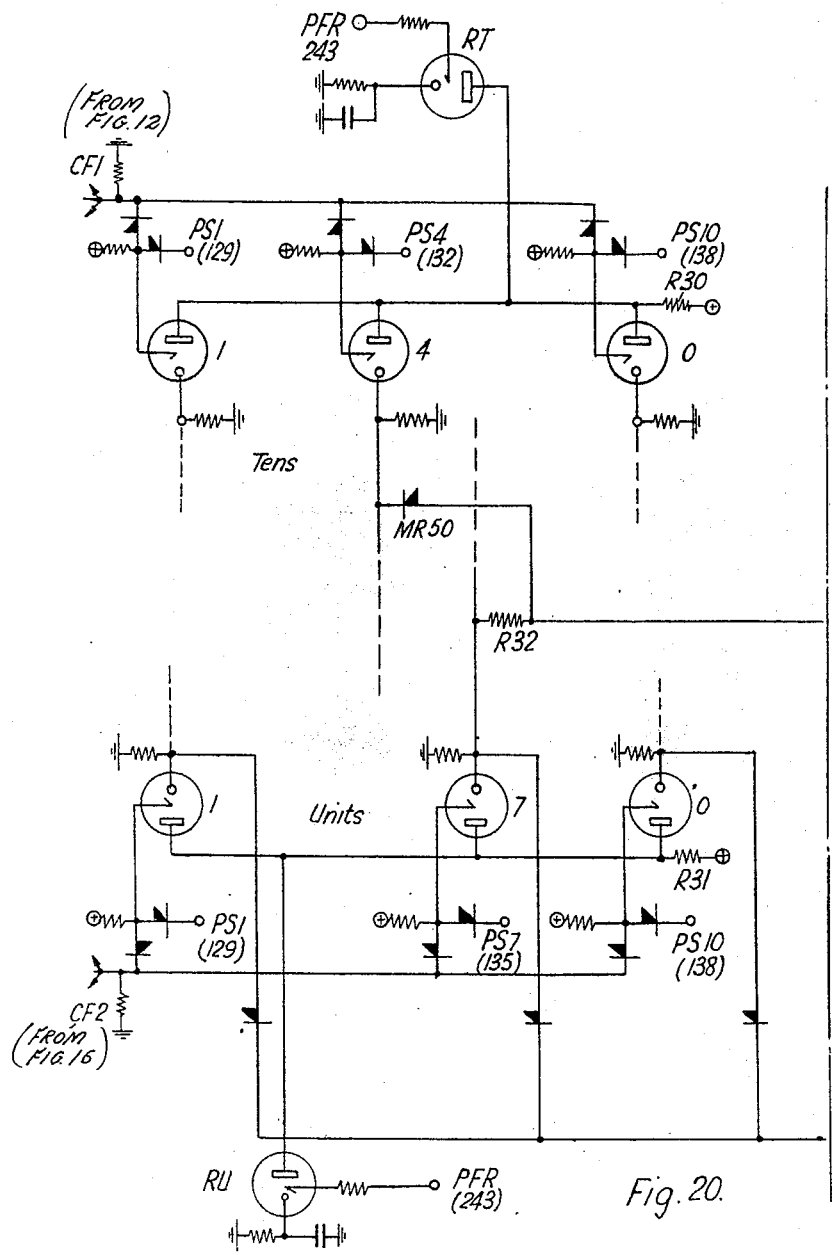
Figure 21:
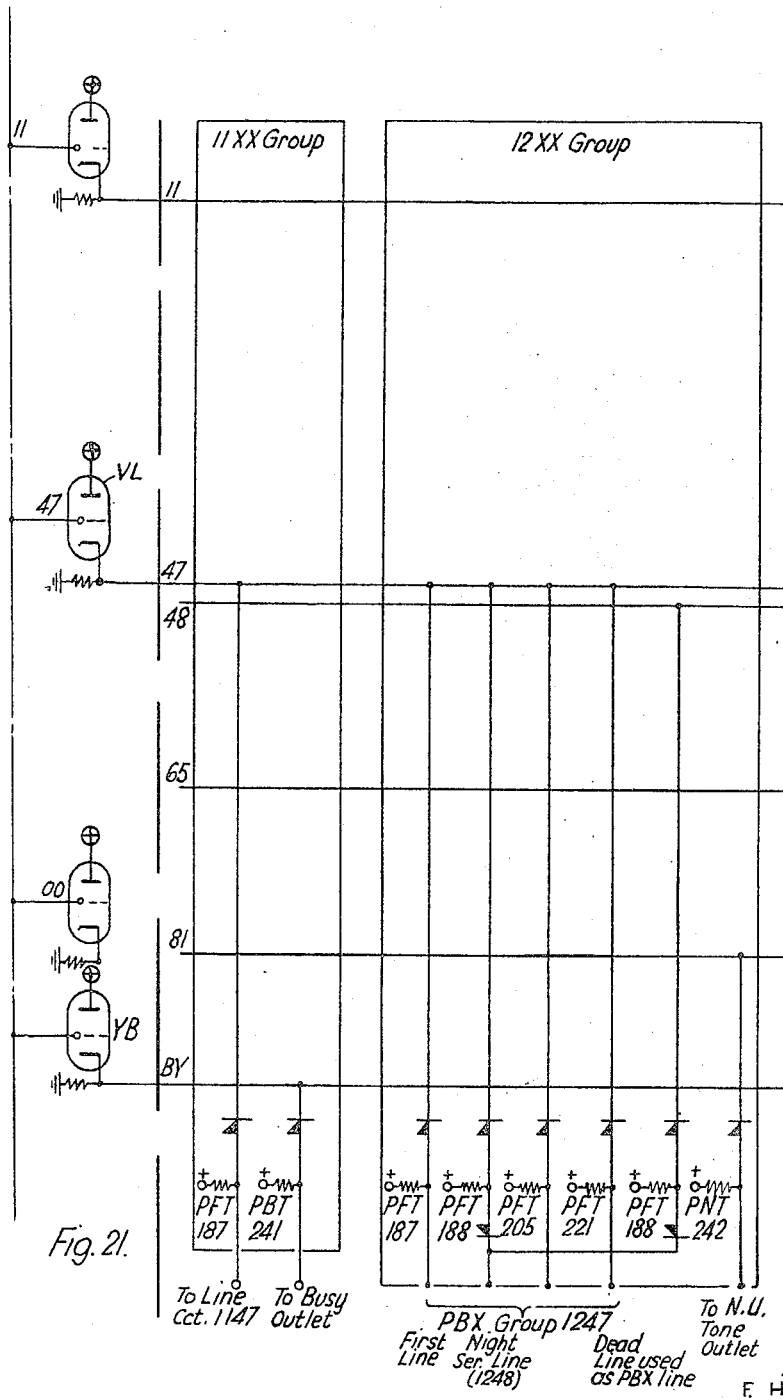
Figure 22:
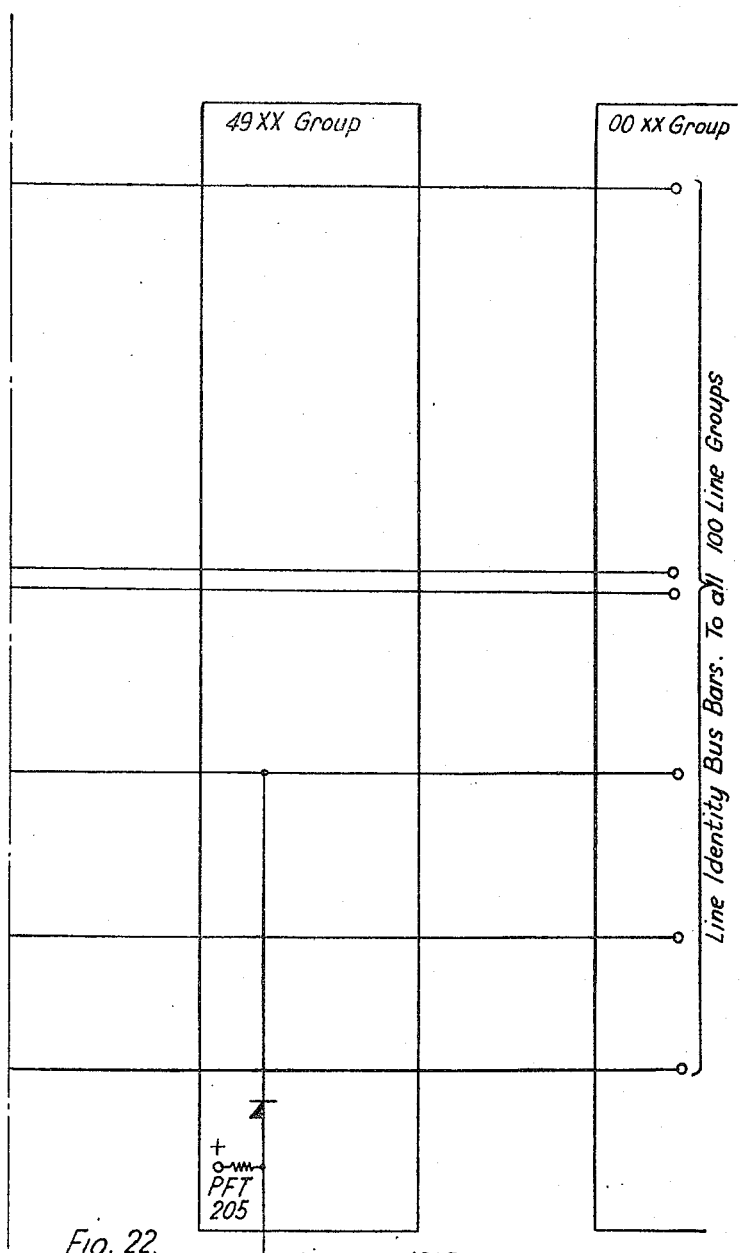

Figs. 20 to 22, of which Fig. 21 should be placed to the right of Fig. 20, and Fig. 22 should be placed to the right of Fig. 20, together show the final selector control circuit serving all final selectors.

Figure 23:
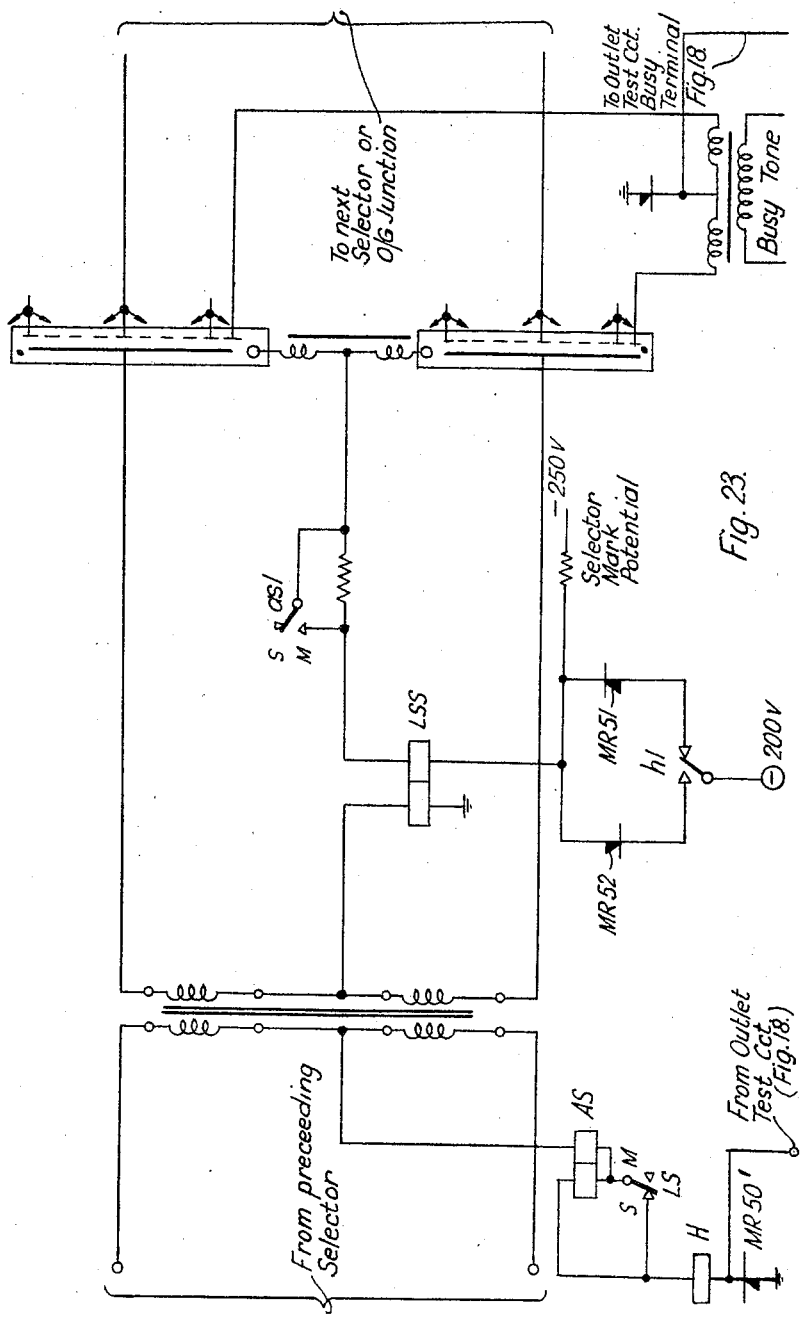

Fig. 23 is a group selector circuit.

Figure 24:
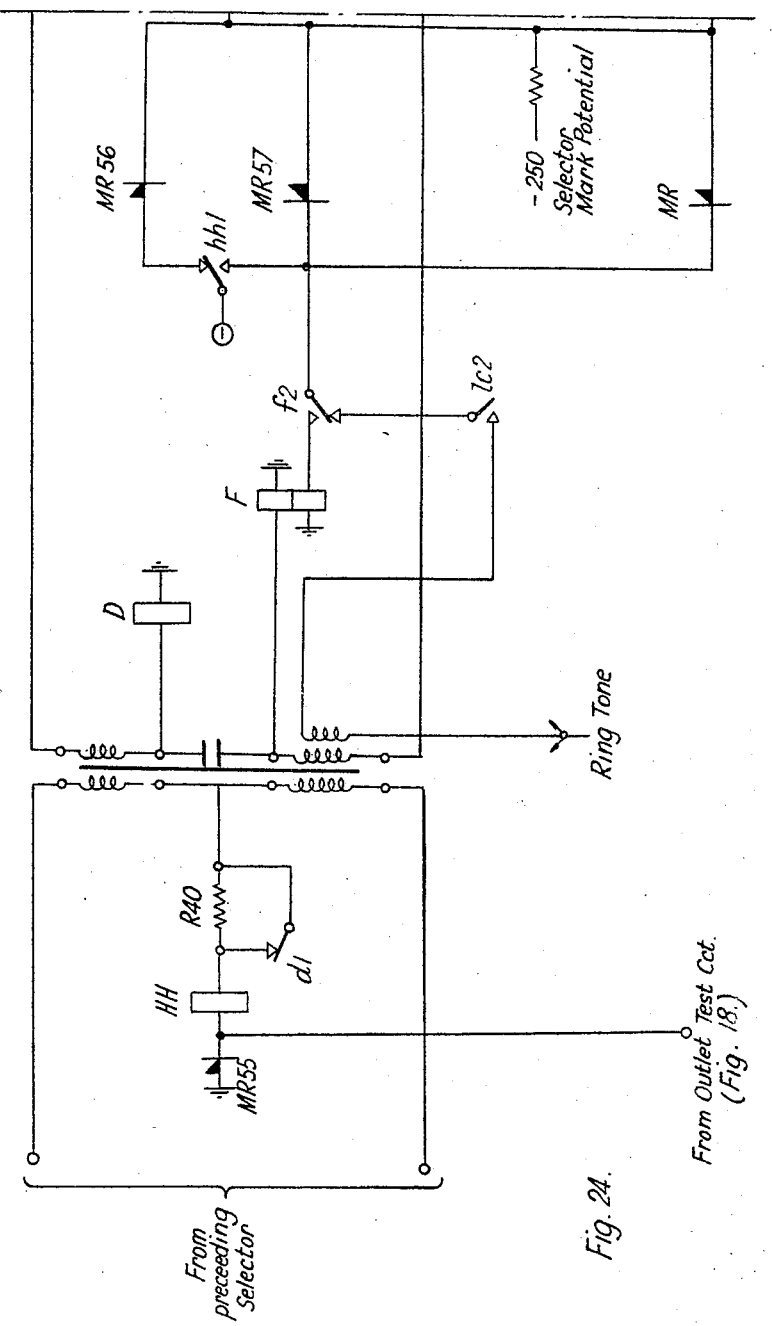
Figure 25:
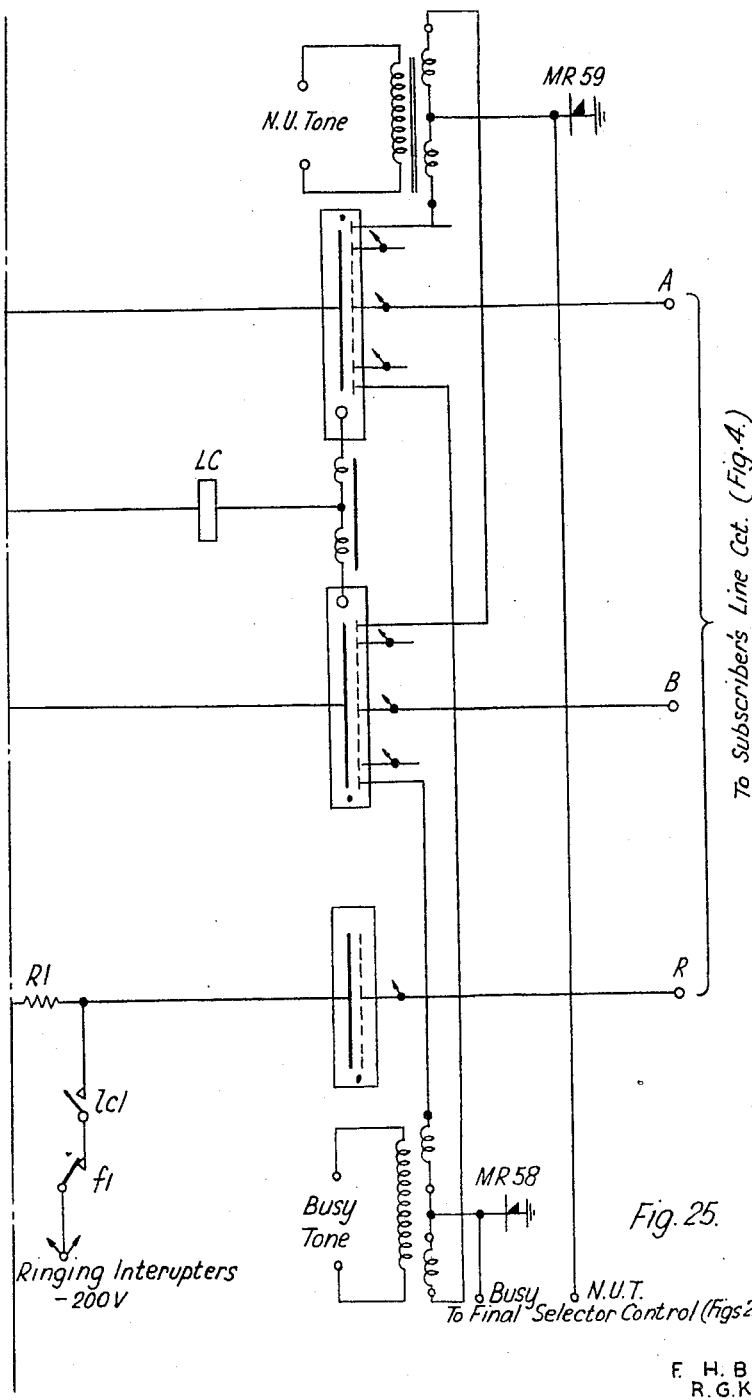

Figs. 24 and 25, of which Fig. 25 should be placed to the right of Fig. 24, together show a final selector circuit.

Figure 26:
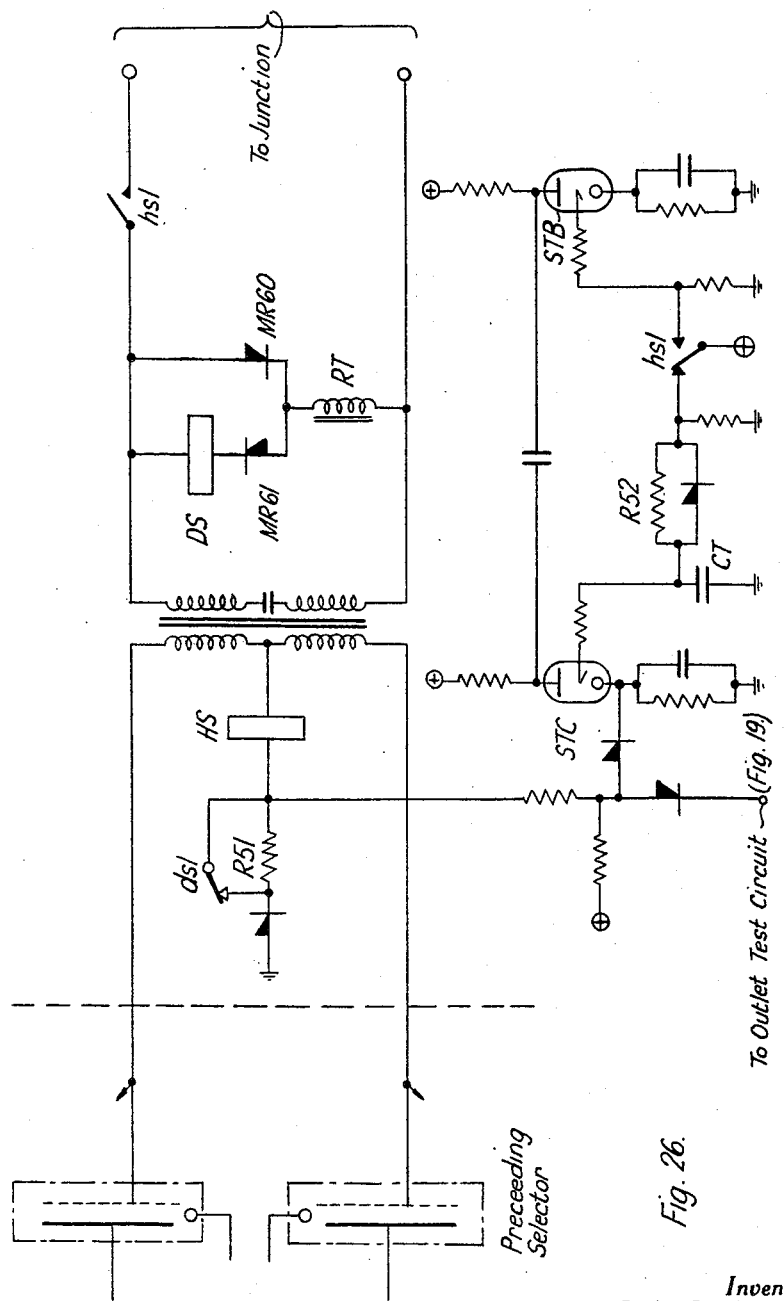

Fig. 26 is an outgoing junction circuit.

Figure 27:
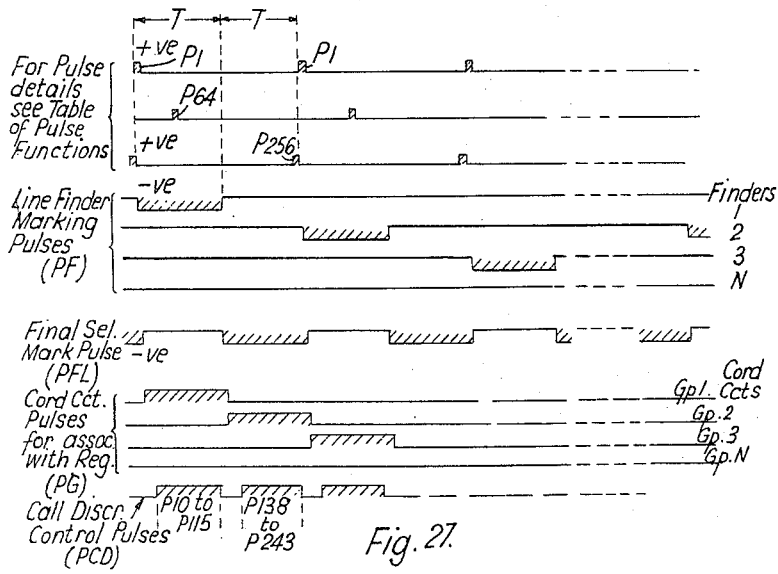

Fig. 27 shows the controlling pulses used in the system.

Figure 28:
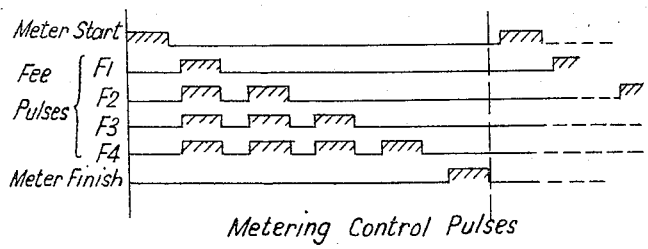

Fig. 28 shows the metering pulses used in the system.

Figs. 29 and 30 are tables explaining the functions of the pulses used in the system.

In the system described, the selectors are cold cathode gas-filled discharge tubes, those which carry speech being constructed in the manner described and claimed in the co-pending application of A. H. W. Beck, T. M. Jackson, and J. Lytollis, Serial No. 347,486, filed April 8, 1953. That application describes a gas tube having two anodes which are closely adjacent one to the other and a single cathode from which the anodes are equidistant. When such a tube is conducting in both anode-cathode gaps, substantially noise-free speech transmission between the two anodes can occur. The action of this form of tube will be more fully described subsequently with reference to Fig. 3. Preferably these selector tubes are constructed to have a number of such two-anode-one-cathode units in a single envelope. Such a multi-electrode tube has a single cathode and a number of pairs of anodes. In each tube, strappings interconnect a number of anodes one from each pair of anodes. These interconnected anodes will hereinafter be referred to as a common anode for the selector in question.

In the actual multiple speech tubes used, any convenient number of anode pairs in one envelope will be used. The selectors could, of course, be formed from assemblies of single unit tubes each having a cathode and two anodes. The multiple tubes which are preferably used are described more fully in the co-pending application of A. H. W. Beck, T. M. Jackson, and J. Lytollis, Serial No. 452,034 filed August 25, 1954. In the circuit diagrams accompanying the present specification these tubes are drawn as having a common anode.

For certain purposes a multiple diode having a common cathode and a number of anodes is used.

Figure 1:
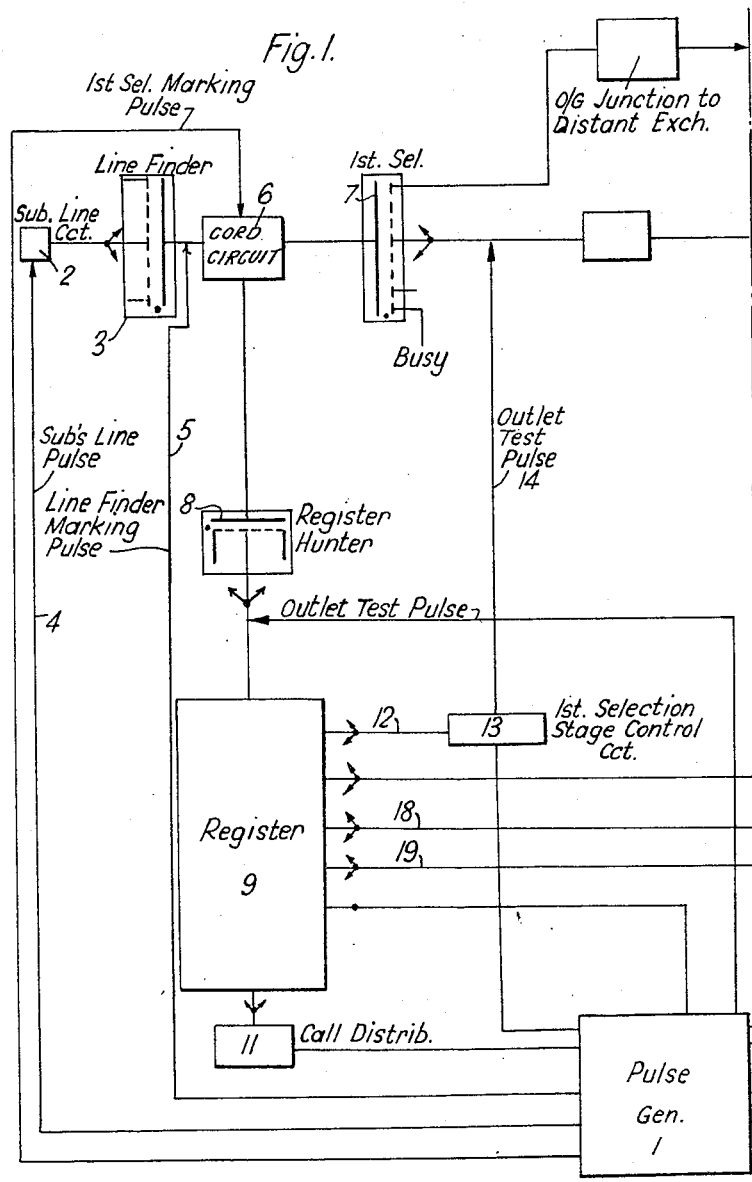
Figure 2:
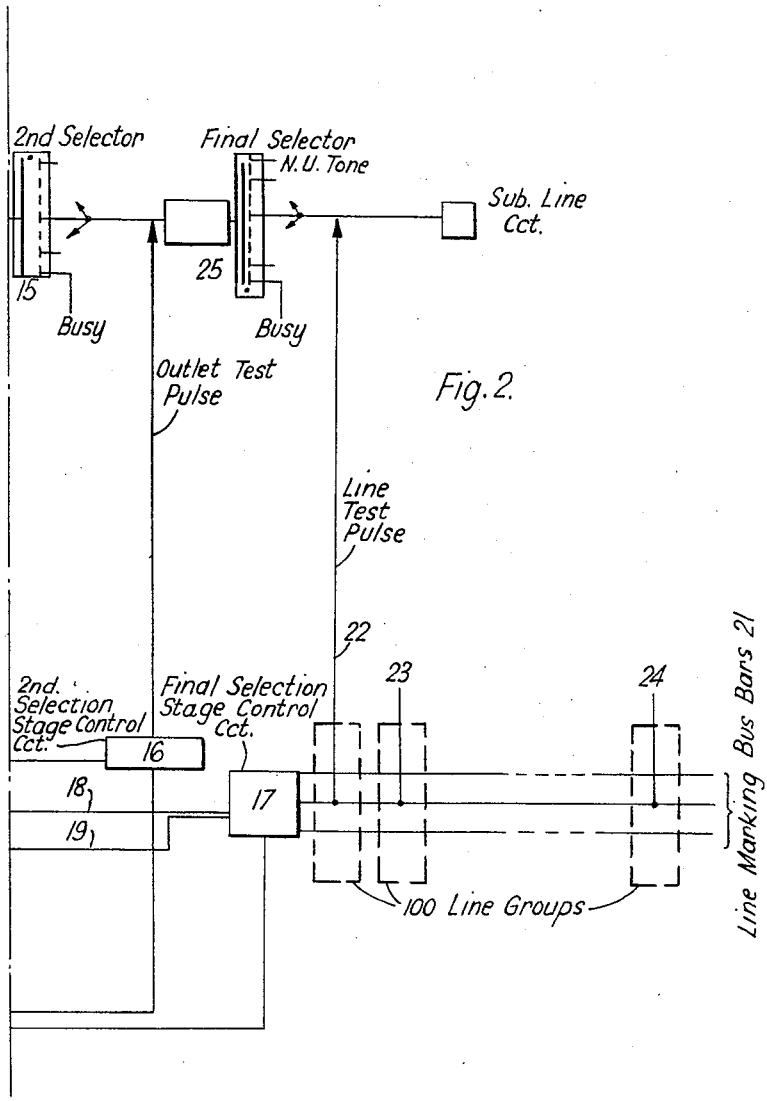

*General description of the system (Figs. 1 and 2)*

The subscribers are in groups of one hundred. All selectors are multi-gap tubes having a common cathode, a commoned set of one hundred anodes and one hundred individual anodes each co-operating with an anode of the commoned set and a cathode. Such a static selector having 100 outlets can be assembled from 100 individual three electrode tubes suitably connected, a number of multi-gap tubes, or a single hundred unit tube. In the trunking diagram of Figs. 1 and 2 the selectors and line finders are drawn as a common electrode representing the commoned set of anodes and a number of separate electrodes representing the individual non-commoned anodes. The common anode (so-called) represents the inlet to a selector while the non-commoned anodes represent outlets from the selector. The system is controlled by pulses supplied from a pulse generator 1, Fig. 1, the pulse patterns from which are shown in Fig. 27. Figs. 29 and 30 tabulate the designations and functions of the pulses from generator 1.

When a subscriber, such as 2, initiates a call a pulse individual to that subscriber is connected to the outlets of line finders, such as 3, serving the group of subscribers including the caller. This pulse, which is supplied by the pulse generator 1 over lead 4 to the line circuit 2, represents the position of that subscriber within his group of a hundred. This pulse has no effect on a busy line finder.

The pulse generator 1 supplies to all line finders, such as 3, pulses individual to those finders, the line finder marking pulse for 3 being supplied to the commoned anodes thereof over lead 5. Each line finder marking pulse has a duration T (see Fig. 27), and during different periods T, different line finders are marked from the pulse generator 1. As will be seen later, line finders and final selectors are able to operate in alternate time periods. When coincidence occurs between a line finder's marking pulse on the commoned anodes of a finder and a subscriber's line pulse on a non-commoned anode of the same finder, discharge occurs between the two anodes of the pair of anodes concerned and the common cathode. That is, the finder is seized for the calling subscriber, and the subscriber is connected from the line finder inlet (the comomned anodes) via a cord circuit 6 to a first group selector, such as 7. At the same time the line finder and the calling subscriber are rendered busy.

The first selectors are arranged in groups to each of which groups a pulse PG is allocated. Selectors in each group are respectively identified by a pulse PGL allocated thereto. These pulses are shown in Fig. 27 and their functions are listed in Fig. 29.

When a first selector is seized, a combination of PG and PGL pulses identifying that selector causes a marking condition to be connected to the common anode of the register hunter 8, there being one register-hunter stage per cord circuit comprising multiple diodes or assemblies of single diodes. Only one selector can be hunting for a register at any one time, thus eliminating any possibility of multiple seizure of registers.

Registers are connected to the individual electrodes of the hunters, and these electrodes are scanned by pulses RH from the generator 1. During a single period T, the hunters are each caused to scan all the registers to which they have access. If a register is free, coincidence between an RH pulse and the hunter marking condition causes a gap to be ionised. The first selector is then connected to a register and the register is busied.

Other first selectors which may have been associated with other calling subscribers are identified by their PG–PGL combinations and these combinations mark their associated register hunters. These first selectors are associated with free registers one at a time, thus preventing any possibility of multiple connection which could occur if several selectors were simultaneously hunting for registers.

After connection of a register, such as 9, to the cord circuit, dial tone which is generated locally in the first selector is sent to the calling subscriber. The latter thereupon dials, and the first selector detects the dialled digits and sends them to the register where they are stored.

The system which has been described is a non-director exchange wherein four digit numbering is used, calls to distant exchanges always starting with the digit one. Obviously the invention is not limited to use in such a system.

For the operation of the system subsequent to storing of the dialled digits, two sorts of call will be described. These are local calls and outgoing calls.

Local calls

When the register 9 has received the last digit, it connects itself to the call distributor 11, of which one is provided for the whole exchange, as soon as 11 is available for use. As a result of this connection the register commences to control selection. At any one time, only one register can commence its selection control operation for the very good reason that there is only one call distributor. During subsequent periods T, however, the call distributor 11 can cause a number of registers to commence connection control operations.

It is a feature of the system that every selection operation occupies a period of time T (see Fig. 27). As soon as the call distributor 11 has, so to speak, set the register going on its selection control, it disconnects itself from the successful register and finds another register which is waiting to start its selection control. Hence during successive time periods T, the call distributor enables a number of registers to initiate their selection processes, thus continuing as long as any registers are in the "calling" condition.

Another feature of the invention is that at each selector stage only one register can be engaged in controlling a selection operation. For example, one register can be controlling selection in the first selection stage, while another is performing the same function in the second selection stage, and so on, the time T for each selection being 30 milliseconds. In other words, we provide a system having a plurality of selection stages in each of which one, and only one, selection operation can be in progress at any time, although any number of selection stages can each have one selection operation in progress. Selection at every stage is by marking from a common control circuit, only one such circuit being required at each stage.

The control of one connection by a register will be considered. After the register 9 has received a start signal due to connection with the call distributor 11, a pulse indicating the value of the first stored digit is sent from the register 9 over lead 12 to the first selection stage control circuit 13. All of the first selectors are served by a single control circuit 13. This pulse indicating the group which is to be hunted is sent over lead 14 to the selector, where it marks the outlets belonging to that group in all selectors.

It will be remembered that one first selector, 7, has been seized for the call being considered, and this selector has its commoned anodes marked. When the outlet marking pulses are applied over lead 14, therefore, coincidence occurs at this selector between the marking condition and the outlet test pulse if an outlet identified by that pulse is free. If coincidence occurs, the gap of the selector for the free outlet is ionised, so that the connection is extended to the second selection stage. Once a gap is ionised the selector including that gap is rendered busy and the marking condition is removed, as will be described with reference to Fig. 3.

Since the circuit 13, which is a common control circuit for all selectors of the first selection stage, has completed its operations for this first selection operation it is released and is available for use by another register for another selection in that stage during the next period T.

The second selection stage, of which one selector 15 is shown, functions in exactly the same manner to perform the second selection. For any one call, the second selection occurs in the time period T following that in which the first stage selection occurred. Connection is thus established to the final selection stage. If all outlets from a selector are found busy at any selection stage, then a special gap in that selector is ionised and busy tone is returned therethrough to the calling subscriber.

A final selector 25 will now have been seized. Associated with all of the final selectors is a single final selection stage control circuit 17 forming the last common control circuit. Final selection occurs under control of two digits, and so when a final selector has been seized, the register sends two pulses to circuit 17 when the latter is available. These pulses, which are sent over leads 18 and 19 respectively, represent the tens and units digits. At the common control circuit 17, these two pulses are detected, and via a gating network they are used to select and to mark one of a set 21 of a hundred bus bars. These are known as line marking bus bars, and each extends through the exchange to all groups of 100 subscribers. Thus bus bar 67 is extended to the 67th subscriber in every group of 100. Connections to three such groups from a single bus bar over leads 22, 23, 24 are shown.

Since only one final selector can be marked at any one time, thus selecting the group of one hundred subscribers from which final selections is made, the coincidence of this marking and of a pulse applied over the lead, such as 22, representing the called subscriber's position in its 100, fires the gap in the marked selector which corresponds to the called subscriber. If the called subscriber is busy, this pulse from the appropriate bus bar of 21 is ineffective, and a following pulse fires the "busy" gap in the final selector. Busy tone is then sent to the calling subscriber. If the dialled number was a deadline it is arranged that another gap in the selector is ionised, and number unobtainable (N.U.) tone is returned therefrom to the calling subscriber.

After trasnmission of the pulses corresponding to the last two digits to the last common control circuit, the register releases, and can be seized by another calling subscriber.

*Outgoing call*

When a register receives a digit or digits indicative of an outgoing call, then, as for a local call, a calling condition is applied to the call distributor. When the call distributor is associated with the register, the latter proceeds with the control of selection. As for a local call a pulse corresponding to the digit received, assuming that this digit denotes an outgoing call, is transmitted to the common control circuit 13 for the first selection stage, and outlets from the first selector stage connected to the outgoing junctions are tested. The selector which has been seized for the call is marked as for a local call, and again coincidence of the selector marking condition and the test pulses fires a gap and the connection is switched to the outgoing junction. The register releases and subsequent dialling by the subscriber is repeated through the first selector to the junction and distant exchange.

The selection of a free junction is performed during the inter-digital time which is easily manageable due to the rapid speed of selection. If there are a number of registers all waiting to commence the control of selection, then the call distributor gives priority to those registers handling outgoing calls over those controlling a local call. Thus if five registers are waiting, all for dealing with outgoing calls, then each is signalled to commence control of the connection at timed intervals of T, which for this system is 30 milliseconds. Thus, from the receipt of the digit indicating an outgoing call to the last register performing its selection, a time of 150 milliseconds is required, which is well within the inter-digital dialling period. If all outgoing junctions are busy, then the busy gap in the selector is ionised and busy tone returned to the subscriber.

*Detailed description*

The general description of the system having been concluded, the detailed description follows. This has been done stage by stage, since it is felt that this is the most convenient method.

Thus it will be seen that the system which we have briefly described above is a system which is subjected to a strict time-pulse cycle control. In each time cycle, therefore, any one or more of the following operations can occur:

(a) A single line finder operation or final selection operation. As will be described more fully later, alternate periods T are used to control line finders and final selectors so that it is impossible for a line finder and a final selector to operate simultaneously in connection with one subscriber.

(b) A selection operation at any one or more group selection stages. As already stated, only one connection can be controlled at any one stage, but during any period T each selection stage (including a final selection stage) can be handling a different call.

(c) Connection of a register to a seized line-finder-first-selector-cord circuit. Again only one such operation can occur during one period T.

(d) Signalling to a register that it can commence selection control for a call in response to operation of the call distributor.

*Gas gap selector control (Fig. 3)*

Figure 3:
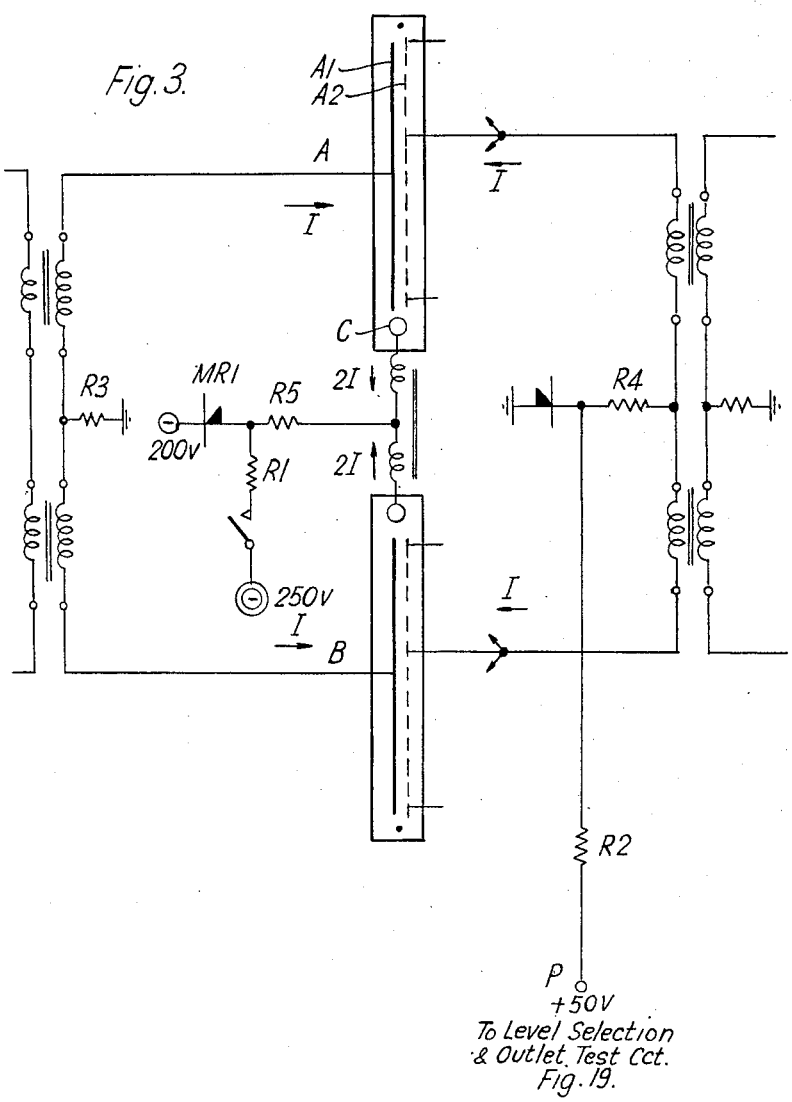
Fig. 3 is an explanatory diagram for the operation of a static selector.

Fig. 3 shows a typical circuit for such a gas gap or static selector where A1 and C are the common anode and cathode respectively and A2 are the individual anodes. Such selectors are transformer coupled and provide input and output speech connections on a balanced circuit. As we have already mentioned, the basic type of tube used has been described in the co-pending application, Serial No. 347,486. In such a tube a voltage of, for instance 200 v. is connected between an anode and the cathode which is insufficient to cause breakdown. Breakdown will only occur when the cathode voltage is reduced further, say to 250 v., and the anode voltage increased by 50 v. In the tubes used in this system there is a common cathode, and a number (for instance 10) of pairs of anodes. Each anode pair with the cathode form the equivalent of a single tube of the type mentioned. The voltages applied to the electrodes are applied through high resistances R1 and R2. When the tube ionises the rectifiers MR1 and MR2 conduct, and assume a very low resistance compared with that of R1 or R2 so that any further application of such control voltages to the selector will be ineffective. It will be noted that the commoned anodes, one from each pair are drawn as if they were a single anode A1, the other anodes of the pairs such as A2, being shown separately.

The control of such a multi-electrode gas-gap switching device is again described more fully in our co-pending application Serial No. 334,192, filed January 30, 1953, which describes the control of a multi-diode, which control method is used in this case for the tubes shown in Fig. 3.

When one gap of the device is ionised and with R3 and R4 equal, currents I will flow in the balanced circuit. If now R3 is increased, current through R3 is decreased, and current through R4 is increased; if R3 is decreased the reverse happens. Similarly by varying R4 the current is varied through R3. Increasing R5 will obviously decrease the currents equally in R3 and R4. When varying R3 or R4 the current through R5 remains sensibly constant. This feature of the tube provides a means for controlling the transmission of signals such as dialling and supervisory signals. Since speech is transmitted over two wires A and B, such selector includes two selector tubes as shown in Fig. 3, one switching the A wire and the other the B wire. Where, as in the line finders, a third wire which does not carry speech, is needed, a multi-diode such as is disclosed in co-pending application Serial No. 334,192, is used.

The control of the gas gap by the simultaneous application of control voltages, and the detection of current changes described above provides the basis of this switching system and is referred to in the following detailed descriptions.

Figure 4:
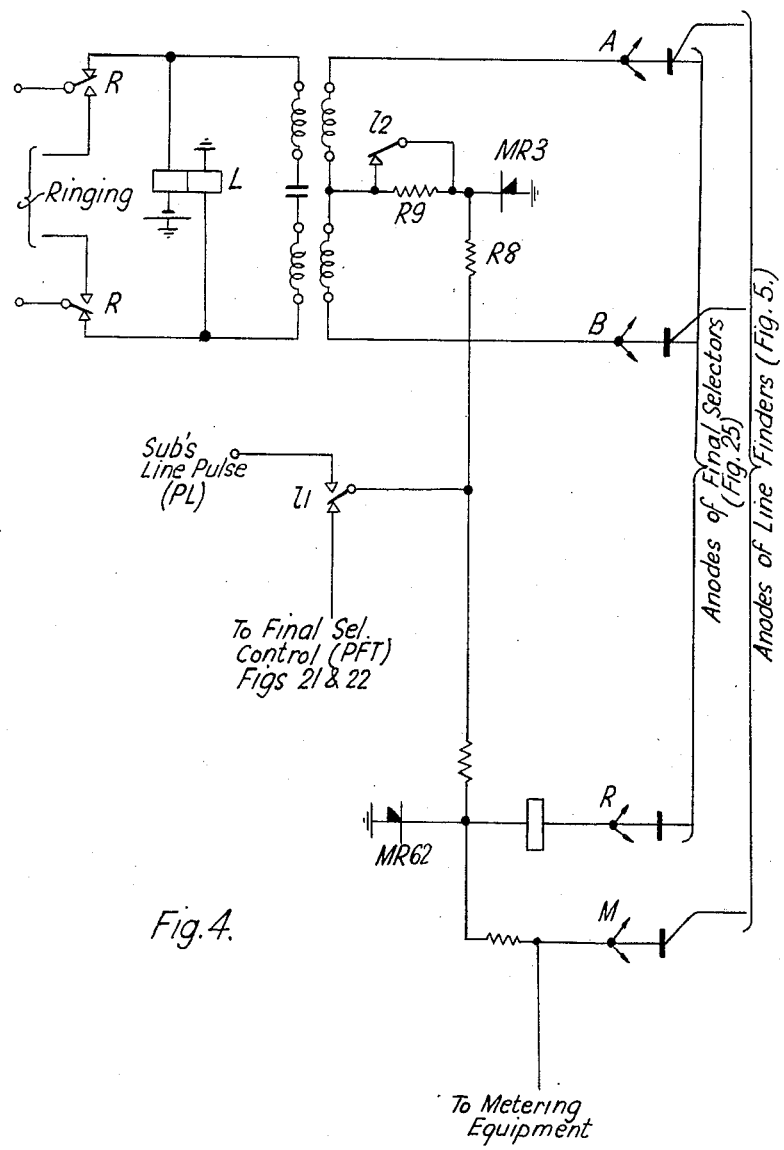
Fig. 4 is that portion of a subscriber's line circuit which is inside the exchange.

*Line circuit (Fig. 4)*

When a subscriber initiates a call he lifts his receiver, and relay L operates over the closed loop. The battery feed to the subscriber is provided through the winding of L. A positive pulse (PL) individual to the calling subscriber in his group of 100 lines is connected via contact l1 and a high resistance R8 to the anodes of gaps in a group of line finders available to the group of 100 lines including the caller, the rectifier MR3 being biassed to its high resistance condition, i.e. blocked by this pulse. Line finder mark pulses (PF) are connected in turn to each finder (Fig. 5), and if a finder is free, coincidence of the calling subscriber's line pulse PL and the finder pulse PF of that finder causes ionisation of a gap therein and the line circuit is connected to the finder and first selector. Although we have said "causes ionisation of a gap therein," it should be emphasized that a gap is ionised in the selector tube for each wire of the line, i.e. A, B, and M (metering) wires. On ionisation of these gaps MR3 and other rectifiers in Fig. 5 conduct, assuming a low resistance such that re-application of pulse PL through high resistance R8 is ineffective. Similarly rectifiers MR4 and MR5 in the finder (Fig. 5) conduct, and the re-application of pulse PF is also ineffective. The subscriber's line circuit and the associated finder are therefore rendered busy to other calls. Relay L responds to dialling, R9 being inserted in the anode circuits of the line finder tubes for the A and B wires, and a change of current occurs in the commoned anode circuit of the finder. This change is detected as described in the description of the finder—first selector circuit (Figs. 5–8).

When the called subscriber answers a signal is connected by the finder through the gap appropriate to the caller of the tube connected to the M wire, this signal being detected by metering equipment. This is described in the operation of the finder circuit.

For calls incoming to the subscriber, a pulse is connected from the final selector control (Figs. 20–22) as will be described later, and coincidence of this pulse with a marking condition applied to the final selector (Figs. 24–25) will ionise gaps in this selector and will extend the connection to the subscriber over leads A, B and R.

The final selector controls the operation of relay R as described in the description of this circuit and ringing signals are sent to the called subscriber. When the subscriber answers during the period that R relay is released, L operates and at l2 removes the short circuit across resistance R9 and a change of current in the final selector is detected, and no further operations of R will occur.

When the subscriber replaces his receiver, L releases, R9 is short circuited by l2, and again a current change is detected either in the first selector or in the final selector.

The A and B connections are connected to the individual anodes of both line finders and final selectors and means have to be provided for ensuring that a calling subscriber is connected to a finder and a called subscriber to a final selector. Reference to the pulses supplied by the pulse generator Fig. 27 shows how this discrimination is performed.

For calling subscribers, i.e. for line finder operation coincidence between line pulses PL (13 to 112 for 100 lines) and finder pulses PF provides means for connection to a line finder, whereas connection to a final selector is possible only at a different time interval, i.e. coincidence between line pulses PFT (141 to 240 for 100 lines) and the final selector marking pulse PFL. Hence the chance of confusion due to simultaneous incoming and outgoing calls is non-existent.

*Line finder—First selector (Figs. 5 to 8)*

Finder mark pulses PF are connected as shown to the commoned anodes of the tubes in the A and B wires and the single common anode of the M wire tube and coincidence of this pulse and a pulse PL in the line circuit of a calling subscriber causes ionisation of gaps in the finder, one gap in each of the tubes being ionised. MR4 and MR5 rectifiers now conduct and further application of PF pulses through high resistances R10 and R11 are ineffective. A choke connects the two common cathodes to a winding of relay A, the second winding being in the commoned anode circuit. This choke presents a high shunt impedance across the speech pair A and B. With R9 short circuited in the line circuit the A relay, which is a polarised relay, is operated to close its "S" contacts due to the cathode winding taking control. When L operates in the line circuit R9 resistance is introduced in one anode circuit of each ionised gap in the A and B tubes, so current increases in the anode winding of A. The cathode current remains substantially constant, and the relay is operated to close its "M" contact. Thus relay A detects dialled impulses.

Contact a1 of relay A is operated to its "M" side when the line finder is associated with the calling line since L is then operated and the cathode potential of tube LF is momentarily depressed via lead 30, rectifier MR6, and condenser C1, and this tube fires and a positive potential developed across its cathode resistance R12. Pulse PG is common to a group of 100 selectors and PGL individual to a selector in a group (Fig. 27) so that coincidence between these pulses and tube LF firing will cause tube S to fire. Cathodes of the S tubes of all circuits, such as Figs. 5–8, are commoned, as shown, so that when one tube fires, the common cathode assumes a positive potential such that no other such tube can fire. This ensures that in each selection stage only one operation occurs at once. The cathode potential of S is applied via high resistances R13 and R14 to the common anodes of the register hunter selector tubes RHS1 and RHS2. These tubes are multi-diodes.

Pulses 13 to 112 and 141 to 240 are the PGL pulses allocated to selectors in a group of 100, so that tube S is fired before or on the application of the last pulse. Hence each of a group of 100 selectors has two individual pulses in the full cycle of 256 portions. The anode of each register hunter tube RHS1, RHS2 is connected then to a positive potential and pulses RH which are negative pulses are connected in pulse positions 114 to 133 or 242 to 5 (i.e. 242—256 and 1 to 5) to the outlets of the hunter, which is assumed to have a 20 outlet capacity. Outlets are therefore tested immediately following the last PGL pulse, i.e. after S fires, if a call is in progress of being dealt with, and again when a free register is found, coincidence between the anode marking potential from the cathode of S and the test pulse will cause ionisation of a gap in each tube of the hunter and connection is established to a free register. Rectifiers MR7 and MR8 conduct, assume a low resistance and the positive marking potential via the high resistances R13 and R14 is ineffective. The hunter and the associated register are now busied. Pulse 134 or 6 indicates end of register hunter search, being known as the PRE pulse. Coincidence of a negative PRE pulse and the common anode of the hunter tube RHS1 assuming a negative potential depresses the cathode potential of SF, and the positive PRE pulse in combination with S fired is connected to the trigger of this tube over rectifiers MR9 and 10 respectively, so SF fires. S is de-ionised due to anode coupling with SF via condenser C2 and point "X" falls in potential to such a value that further appearances of PG and PGL will not re-fire tube S. A tube S can now fire in another selector for association with another register. Since potential SF has ionised, its cathode potential rise supplies a positive pulse over lead 31 to the trigger of DA which fires and in turn connects positive potential to the trigger of DT from its cathode. DT acts as a relaxation oscillator producing dial tone frequency which is induced into the line transformer and dialling tone is returned to the subscriber. The subscriber thereupon dials, and the A relay follows the impulses from the dial and via a contact a2 varies the resistance in series with MR7 and hence the current flowing in the ionised gap of the register hunter tube RHS1.

This change is detected in the register (Figs. 9 to 16) as will be described later. When A releases the condenser C1 in the cathode circuit of LF charges slowly and is discharged on the next operation of A. The charging time of C1 is such that the voltage across C never rises during dialling to such a value as to provide a condition for triggering the tube TR which operates the RR relay. All digits dialled by the subscriber are repeated by the A relay to the register and stored.

As will be described in the description of the register, the establishment of the connection is under the control of the register, and prior to outlets of the first selector being tested, a pulse PM in pulse position 121 or 249 is transmitted through the register hunter tube RHS2 via MR8, depressing the cathode voltage of tube M via lead 32 while the pulse PM is applied to the trigger, so that M fires and relay RL operates. At its contact rl1, relay RL connects a negative marking potential via high resistances R16 and R17 and relay LS to the common cathode of the first selector, rectifier MR11 being blocked to this increased negative potential.

Test pulses are connected to the outlets from the first selector from the level selection and outlet test pulse circuit (Figs. 18 and 19) as, will be described, and coincidence of the marking condition applied by RL relay and an outlet test pulse causes ionisation of a gap in the selector tube for each wire, and the connection is extended to the next selector. RL at rl2 disconnects the earth via MR7 and MR8 to the common anodes of the register hunter tubes and the gaps are deionised. The register is thus disconnected from the first selector but is maintained busy locally, as will be described in the register description, until it has completed the connection of the call.

Prior to the register transmitting a pulse PM to operate RL in the selector it sent one of four fee pulses (PFF) in time positions 116 or 244, 117 or 245, 118 or 246, 119 or 247 indicating the chargeable fee, single, double, treble or quadruple. This pulse is transmitted via the register hunter and MR8 rectifier, and causes a depression of the voltage of the common cathode lead of tubes, FA, FB, FC and FD, the rectifier MR12 being blocked to this condition. If the pulse transmitted was indicative of, for example, a double fee then tube FB fires due to the coincidence of pulse 117 or 245 being applied to the trigger and the depression of the cathode potential. FB fires and the fee category is stored in the selector.

When an outlet is seized by the first selector and a gap is fired, currents flow in the windings of a polarised relay LS such that contact ls1 of LS is held to the "S" contact, as shown in Fig. 6. When the connection is established and the subscriber answers there is an increase of current in the winding of LS connected to the anode and the LS contact ls1 operates to the "M" contact. This is described in detail in the description of the group and final selectors.

Metering control pulses are provided, as shown in Fig. 28, and with ls1 operated to the "M" contact, tube MS is ionised on the meter start pulse. Fee pulses F1 to F4 connected via rectifiers to the anodes of tubes FA to FD will be gated through the fired tube. Thus if FB is fired, indicating a double fee call, F2 connected via a rectifier MR13 will short circuit effectively the anode resistance R18 and the two fee pulses will appear at the cathode.

The anode of MP is connected to a positive pulse supply, such as F4, and so MP ionises when the first F2 pulse arrives over lead 33, biasing MR14 positively, since MS is fired with its cathode potential biassing MR15 positively and since the cathodde of MP is connected to the anode of the multi-gap diode of the line finder, then the potential will be varied at this point. This change of potential will be apparent in the line circuit and can be detected by means not shown. When the first pulse terminates, MP is deionised and refires on the second F2 pulse and a change of potential is again detected. The meter finish pulse will ionise tube MF, tube MS is de-ionised due to anode coupling, and the anode of MF and hence point "Y" will assume a negative potential. Rectifier MFR will now be connected to a potential below its original value prior to MF ionising, so that further meter start pulses will be ineffective in firing MS.

When the calling subscriber hangs up his receiver relay A releases and condenser C1 in the cathode circuit of tube LF will charge to this cathode potential. Pulse PSR in time positions 10 or 138 will now fire tube TR and operate relay RR connected in its anode circuit. RR relay at rr1 disconnects the negative potential via rectifier MR11 to the common cathode of the first selector and via MR5 to the common cathodes of the line finder tubes. Gaps in these selectors are thus de-ionised. Potential is removed similarly from the multi-diode gap in the line finder and de-ionises the fired gap. With tube TR fired its cathode rises to a positive potential and coincident with pulse PR in time positions 9 or 137 tube TRR fires. Tube TR is de-ionised due to the common anode load and relay RR releases and the line finder and first selector are available for another call. At this point it will be remarked that resistance R17 is chosen to have a value such that the voltage applied to the selector cathode via rr1 operated and R17 cannot operate the selectors.

*The register (Figs. 9 to 16)*

As described above, the first selector is associated via the register hunter with a free register via an ionised gap of each of RHS1 and RHS2. In the interests of clarity tubes RHS1 and RHS2 appear in Figs. 9 and 10 as well as in Figs. 5 and 6.

Figure 14:
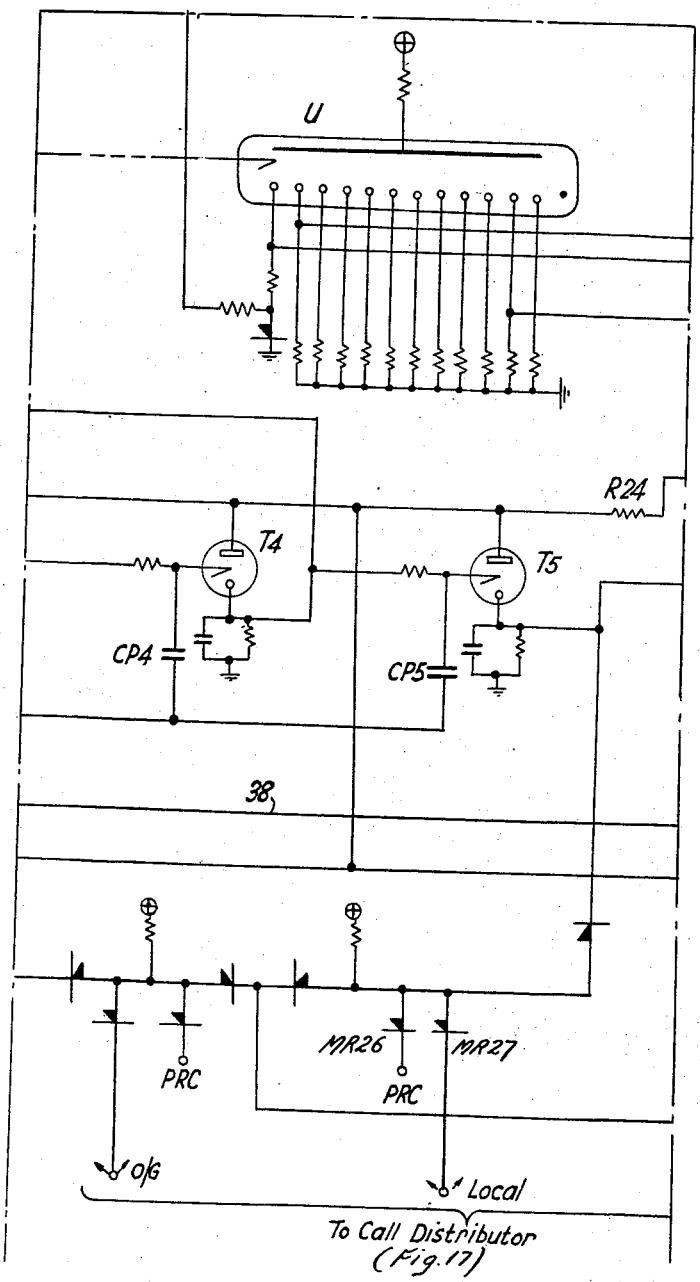
Figure 15:
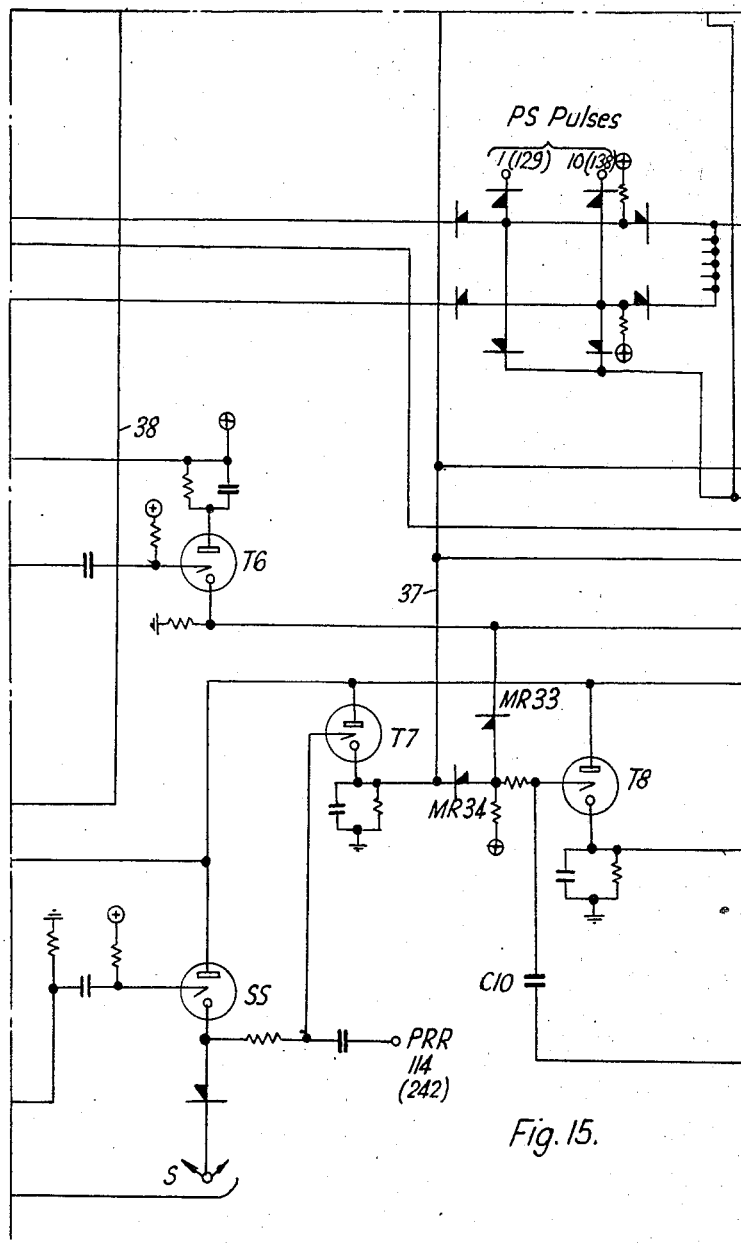
Figure 16:
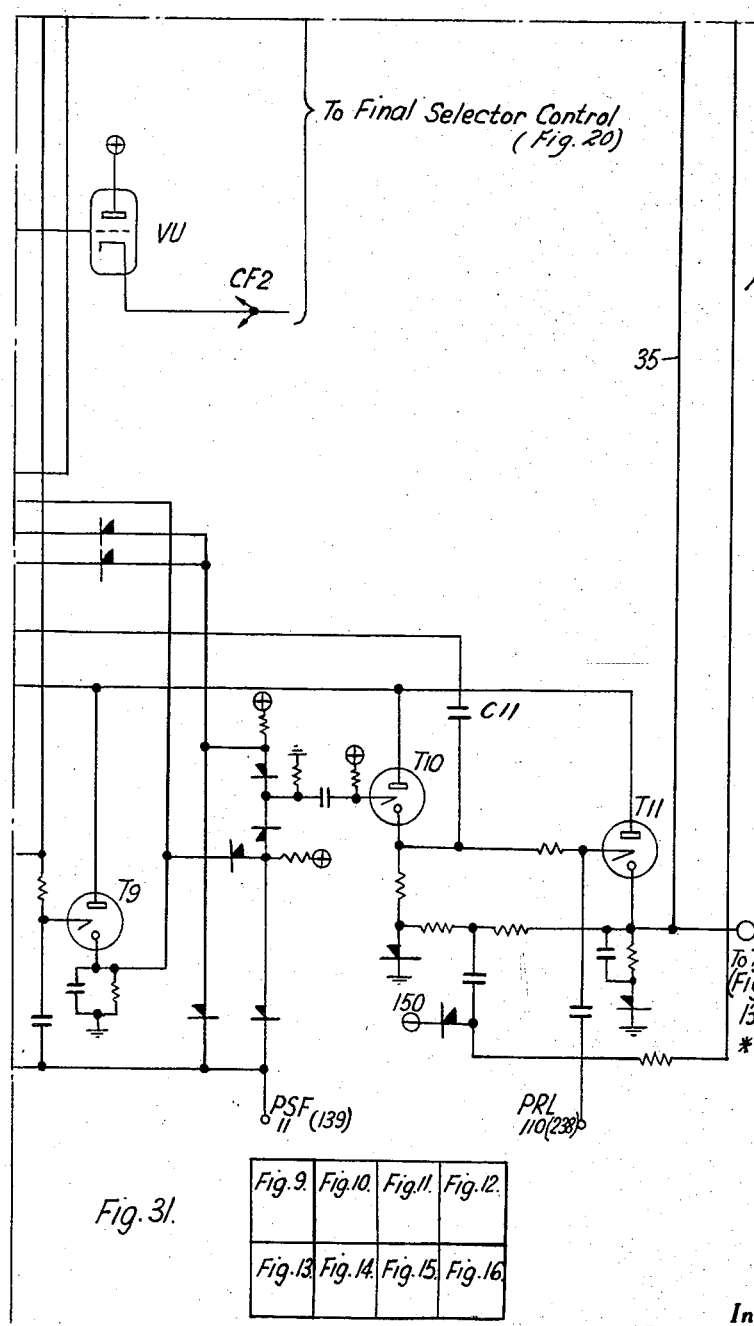

On ionisation of a gap in each of RHS1 or RHS2, a potential is developed across R20 and R21, and the rise across R20 fires tube TA. TB is then extinguished if it was ionised due to the anode coupling. The potential at the cathode of TA will charge C4 via R22. Tube T11, as described later, is normally ionised, so that when C4 is charged, this condition with coincidence of T11 and TA fired ionises tube TC. T11 biasses MR21 positively in the controlling gate of TC. The cathode of TC is connected via a resistor R23 to condensers CP1 etc., so that when TC fires a positive pulse ionises tube T1 which has been previously biassed from the cathode of T11. This is the operation of a conventional pulse plus bias counter. T1 fires and de-ionises T11, since resistor R24, in Fig. 14, is a common anode load for these tubes, and also for a number of other tubes. On seizure then, tubes TA, TC and T1 are all ionised and the register is ready to receive dialling impulses.

When A releases in the first selector the potential across R20 in the cathode of the hunter falls due to the insertion of resistance in the circuit of the common anode (as already described), and hence a negative pulse is fed via a condenser C5 to the cathode of tube TB. The rectifier MR22 in its cathode circuit is blocked to this condition. Tube TB fires and TA is de-ionised and a positive potential is developed at the cathode of TB. TC is de-ionised, being cathode-coupled to TB, and with TB and T1 both fired, rectifiers MR23 and MR24 are both connected to a positive potential and hence tube G1 fires.

Previously when tube T11 fired, a positive pulse was delivered to the trigger of TE over lead 35 and this tube fired and a negative potential was developed across its anode resistor which was fed to the "H" cathodes (rest cathodes) of all multi-cathode storage tubes. Discharge then occurred between the common anode and this selected cathode in all storage tubes. The storage tubes have been ionised at the home or "H" cathodes. When tube T1 fires, a positive potential is delivered to the cathode of tube TE over lead 34 and condenser C6 to deionize this tube.

Returning to the sequence, when G1 fires, a negative going pulse is supplied from its anode to the transfer electrode of the thousands digit storage tube TH via C7, and the discharge is transferred to No. 1 cathode. This operation is the known technique for stepping such multi-cathode tubes as for example the tubes described in the U.S. Patent No. 2,553,585, issued May 22, 1951, to G. H. Hough.

The first release of relay A in the first selector has therefore caused tube TH to be ionised to cathode 1. When A re-operates TA will re-fire and extinguish TB but due to the charging time of C4, TC will not ionise unless A remains operated for a certain time, in this case at the end of a dialled digit. TA and TB tubes will ionise to the make and break of "A" relay, TC will not fire and G1 will supply negative stepping pulses to the TH storage tube. When G1 fires and supplies a negative going pulse it will extinguish when its anode condenser C8 has charged since the resistance R25 is of a high value such that G1 will not sustain.

At the end of the digit "A" remains energised in the first selector, condenser C4 charges and tube TC refires and from its cathode delivers a pulse to condensers CP1 etc. Tube T2 will fire to this pulse, being primed from the cathode of T1 and T1 is de-ionised. T2 will bias rectifier MR25 to a positive potential. MR24 is now held at earth from the cathode of T1, so that when the next digit is dialled and TB ionises on each release of relay A, then tube G2 only will ionise and stepping pulses corresponding to the dialled digit will be supplied to the hundreds storage tube H. Digits are therefore stored on the storage tubes TH, H, T and U, tubes T1 to T5 firing in turn, TC firing at the end of each digit, and when T5 ionises this provides the condition that all dialling has been completed, and the register is now ready to control the connection of the call.

A pulse PRC individual to each register biasses MR26 positively, and since MR27 is biassed positively at this time, T5 gates a positive condition on the local lead to the call distributor (Fig. 17). Assuming that the local tube VL (see subsequent description) is fired in the call distributor circuit, then with a positive potential on the local lead, tube SS is fired in the register, and its cathode assumes a positive potential, and since the cathodes of the tubes SS of all registers are commoned together, this prevents the "SS" tube from firing in any other register. Tube T5 is deionised. Pulse PRR which occurs after the last register pulse PRC now fires tube T7, and tube SS is de-ionised so that another register in the next cycle of PRC pulses can fire its "SS" tube and be associated with the call distributor. SS and T1 to T7 all have the same anode load resistor R24.

Tube T7 now controls two functions, the transmission of a pulse indicative of the fee to the first selector and of a pulse to the first stage level selection circuit (Fig. 18) which controls the selection of a free outlet by the first selector. Assume the first digit stored is 2 and that calls with this first digit are single fee calls. Coincidence of PFF pulse 116 or 244 which is indicative of a single fee, with positive on the cathode 2 of tube TH, and positive on the cathode of T7, both of which tubes are ionized, will apply a pulse to the trigger of tube TF, since MR30 is biassed positively from the cathode of T7, MR31 from cathode 2 of TH, and MR32 from PFF. The cathode of TF is connected to negative pulses of the same repetition rate as the PFF pulses. TF will fire for the duration of one pulse, and a negative-going pulse is fed from its anode to the outlet of the register hunter tube RHS2, and this pulse is transmitted to the first selector where tube FA is fired to store the single fee indication. If the first digit 1 is indicative of a double fee call, then, in a similar manner, PFF 117 or 245 will fire tube TF, a negative pulse in this time position will be transmitted to the first selector to fire tube FB to store the double fee indication.

Pulse PM (121 or 249), coincident with T7 fired, will re-fire TF and again a negative going pulse from the anode of this tube is fed to the outlet of the register hunter tube RHS2 and this pulse will control the operation of RL in the first selector as described above. Following the PM pulse, PS pulses are connected as shown to the cathodes of tube TH and if this tube is ionised to its 2nd cathode then with T7 fired, VT will conduct for the duration of PS pulse 130 or 2, and a pulse in this time position is transmitted over the "CF" lead to the level selection and outlet test circuit (Fig. 18). This circuit controls the selection of a free outlet by the first selector, as described later in the description of this circuit.

This timed pulse is produced by the gating network connected to the grid of VT, which interconnects T7 cathode, PS pulses and the cathodes of TH.

Tube T6 was ionised under the same conditions as tube SS, and following the PS pulses, pulse PSF in time position 11 or 139 is applied to the trigger of tube T8 via C10, and, since T6 and T7 are ionised and biassing MR33 and MR34 positively, T8 fires and causes T7 to de-ionise due to the common anode load R24.

T8 prepares the circuit for gating a pulse indicative of the second digit via VH under control of the gating circuit connected to the grid thereof and the "CS" lead to the level selection circuit (Fig. 2) serving the second selection stage, when the PS pulses appear in the next time cycle "T." The time allocated therefore for performing selection in any switching stage is precisely "T," in this case 30 milliseconds. Tube T9 fires on the next PSF pulse with T8 ionised and de-ionises T8 due to the common anode load R24, and the cathode potential of T9 prepares the circuit for gating pulses indicative of the tens and units digits in the next time cycle T via VD and VU to the final selector control. This circuit controls the testing and selection of the wanted subscriber's line, and will be described later.

Coincidence of PSF pulse and T9 fired will ionise tube T10 and tube T6 is de-ionised due to cathode coupling via C11. Register release pulse PRL in time positions 110 or 238 will fire T11 with T10 ionised. Tube TE is ionised from the cathode potential of T11 over lead 35 and tube TG is de-ionised due to anode coupling.

The negative going pulse developed at the anode of TE is fed via lead 36 and resistances to the home cathodes of all digit storage tubes and the discharges in these tubes are transferred to these cathodes.

Before TE fired, TG was ionised due to the coincidence of potentials with T7 fired, biassing MR35' positively via lead 37, and the application of the register guard pulse in time positions 122 or 250, which biasses MR36' positively. The potential values shown are typical values such that the cathode of TG will rise to about −170 v., assuming 80 v. sustaining voltage of the tube, and a connection from the cathode of TG via rectifiers MR37 and MR38 will keep these rectifiers in the conductive condition such that the register hunter outlet test pulses are still rendered ineffective. The register is still kept in the busy condition even when RL operated in the first selector as previously described.

The ionisation of TE followed by the de-ionisation of TG therefore removes this condition and rectifiers MR39 and MR40 are now blocking to outlet test pulses and the register is free for another call. Tubes TE and T11 are left fired and the digit storage tubes are all ionised to their home cathodes.

This description covers the register operation for a local call where all digits are received and stored. For a call outgoing to a distant exchange the operation is as described previously with dialled digits stored on the storage tubes TH etc. For the purpose of describing the operation, assume that the first digit gives the necessary discrimination for an outgoing call, in this case digit 1. Tube T2 is fired after the reception of this digit, and coincidence of positive potentials with T2 fired and tube TH ionised to its No. 1 cathode will fire tube 2A. This occurs when cathode 1 of TH biasses MR41 positively over lead 38 and rectifier MR42, MR43 being biassed positively from the cathode of T2. The operation of tube 2A deionizes tube T2 because of the common anode resistor R24. The register is associated with the call distributor via the outgoing lead with application of its PRC pulse in the same manner as previously described and tube SS is ionised. Tube T7 fires as before with the application of PRR pulse, tube SS is de-ionised, permitting another register to be associated with the call distributor, and, as already described, a pulse is transmitted to the level control circuit which controls the selection of a free outlet from the first selector to an outgoing junction to the distant exchange. With T7 fired, the U storage tube ionised to its home cathode, and the application of the PSF pulse, tube T10 is fired. Further operation is as before, the register is released and the first selector is connected to an outgoing junction. This sequence of operations has been performed in the inter-digital time due to the high speed of selection and further dialling by the subscriber is repeated by the first selector to the distant exchange. Provision is made that if a number of registers are all waiting to commence the control of selection, preference is given by the call distributor to those registers handling outgoing calls, local calls being delayed. This ensures minimum delay in seizing an outgoing junction during the inter-digital time.

Thus if five registers are all waiting to control selection for their calls and four are controlling outgoing calls, then these will be cleared in turn at time intervals of "T" (30 milliseconds), the last being delayed 120 milliseconds which is well within the inter-dialling period of approximately 400 milliseconds, the last register dealing with a local call is then released. This is described in the description of the call distributor.

*Call distributor (Fig. 17)*

For the purpose of description, assume a register handling a local call is associated with the call distributor, in which case the local tube LOT is ionised, and VL is conducting for the period of the PCD pulse which covers the time period allocated to all register PRC pulses. Tube SS in the associated register is fired and the rise in potential on the commoned cathodes of the SS tubes prevent other "SS" tubes firing. Pulse PCO which follows PCD fires the outgoing tube OGT which has been primed by the local tube LOT. During the next time cycle "T" tube VG will conduct for the duration of the PCD pulse, the outgoing connection to the registers will assume a positive potential, so that only registers dealing with outgoing calls will have the opportunity of using the call distributor. If such registers are waiting, then one will fire its "SS" tube and following the last PRC pulse, the POG pulse fires tube TTA due to VG conducting and an "SS" tube fired. Pulse PCO will fire the local tube LOT which as been primed by OGT, but at pulse PDR the OGT is re-fired due to coincidence of this pulse with TTA fired. VG is thus rendered conducting for the next time cycle "T" and again any register dealing with an outgoing call is cleared and will proceed with the control of the selection. Pulse PDS fires tube TTB which de-ionises TTA and during the next time cycle VG conducts and again any register dealing with an outgoing call is cleared. If no register is in this condition then no "SS" tube will fire and at the end of the time cycle the local tube LOT fires and since TTA is not ionised due to no "SS" tube firing, the OGT will not fire to the PDR pulse. VL therefore conducts during the next time cycle T and any register waiting to commence the connection of a local call will be cleared.

The call distributor therefore alternates between the local and outgoing condition for timed intervals T but will remain in the outgoing condition until no register is left waiting to establish its connection for an outgoing call. Local calls are cleared at every alternate time cycle "T" if we assume no registers waiting for outgoing calls. Two local calls are therefore established spaced apart by time 2T, since the selection time of the final control circuit requires this period, as described later in the description of this circuit.

*Level selection and outlet test circuit (Figs. 18 and 19)*

This circuit is equipped per group selection stage; it determines the group of outlets to be tested and connects test pulses to outlets in that group. It has therefore been referred to in the introductory general description as a common control circuit for all group selectors of a stage.

As described in the description of the register a pulse is transmitted to the circuit of Fig. 18 indicative of the digit stored, and assuming the digit is 2, then a PS pulse in time position 2 or 130 is transmitted over the "C1" lead and coincidence of pulses will fire level selection tube LS2. It is assumed that the circuit of Fig. 18 is the control circuit for the first selection stage, being controlled over lead C1. The common control circuit for the second selection stage is controlled from the register over lead C2. The potential of the cathode of tube LS2 will rise to a positive potential and coincidence with PT pulses in the time positions shown will cause tubes OT to conduct in turn and pulses will be developed across their cathode loads and connected to the outlets of level 2 of all selectors in the selection stage. Ten outlet test pulses are shown for explanatory purposes. The circuit shows the testing of outlets in graded groups, grading and methods of grading being well known in the art. Of the level selection tubes and their test pulse tubes only those for levels 2 and 10 are shown.

Outlets from four multipled groups of selectors in the same selection stage are shown for explanatory purposes in Fig. 19 and on level 2 a possible grading connection is shown. Three outlets are individual to each group of 10 selectors, three to each of 2 groups and four outlets are available to all 4 groups giving a total of 22 outlets on level 2 of all 4 groups. These outlets are connected via high resistances, as shown, so that all the individual outlets are tested by pulses 1 to 3 in time positions 25 to 27 or 153 to 155, outlets common to 2 multipled groups of selectors by the next 3 pulses, and outlets common to all groups by the remaining 4 pulses.

As an example, consider the selection of a free outlet by the first selector. RL relay operates in the first selector prior to outlet test, as previously described, and will mark that selector by connecting a marking potential to the common cathode of the tubes of that selector. Only one selector is marked at a time so that although outlet test pulses are applied to all first selectors they are only effective on this one selector which is marked. Fig. 23 shows a group selector connected from an outlet of the first selector and shows the connection to the outlet test pulse. If this circuit is free then coincidence of the marking condition in the first selector and the test pulse via a high resistance, as shown, will ionise a gap in the selector, MR50' will conduct and assume a low resistance, and further application of the pulse will be ineffective. The outlet is busied, and the marking condition is removed in the first selector due to rectifier MR11 therein conducting, so that the application of test pulses to other outlets of this selector will not ionise another gap.

Returning to Fig. 18, tube B fires when any PS pulse is transmitted over the "C" lead, and, following the last outlet test pulse PT in time position 34 or 162, BY conducts and a pulse is connected to the busy tone gap of the first selector. If all outlets were therefore busy from this selector, coincidence of this pulse with the marking condition fires the busy tone gap of the selector and tone is returned to the subscriber. Obviously this pulse applied to the busy tone gap has no effect if an outlet has been successfully seized.

Tube R will ionise to the PLR pulse following pulse PB and, due to the common anode load, the level selection tube is de-ionised, tubes, such as OT, are cut off, and the outlet test pulses will not be connected until the circuit is re-seized by another register.

Final selector control (Figs. 20–22)

It will be remembered that, after the group selection has been effected, the register transmits to the final selector control circuit pulses indicative of the tens and units digits dialled to this circuit via CF1 and CF2 leads respectively, which are common to all registers. The digits are assumed to be 4 and 7, so that tens tube 4 and units tube 7 will fire due to coincidence of PS pulses, as shown. These tubes are selected from a group of ten tubes for the tens and a similar group for the units. Since the tubes in each of these sets have common anode load resistors R30 and R31 respectively, only one tube in each set can be discharging at once. As a result of the firing of the tens tube 4 and the units tube 3, positive potential is developed at the cathodes of these tubes. These potentials cause a positive potential to be applied by the gate formed by MR50 and R32 to terminal 47 only, and tube VL conducts. 100 such tubes are provided connected to the gates controlled by the tens and units tubes. The cathodes of the VL tubes are connected to 100 bus bars to which lines in each group of 100 lines can be connected. As has already been stated, this set of 100 bus bars is common to the whole exchange.

Assume the number of the required subscriber is 1147. As described previously only one call at a time is established in each selection stage, so that only one final selector has been seized and a marking potential connected to the cathode of its lock-out tube. The lock-out tube in a selector is the tube which shares a common cathode load resistor with similar tubes in all other selectors of that stage. With bus bar 47 at a positive potential, coincidence of this potential with the subscribers final control test pulse PFT 187 (which is the pulse for all subscribers 47 in each group of 100 lines) will connect this test pulse to line circuit 47 in each group of 100 lines. The final selector which has been marked is in the required 100 line group, so that if the line is free, a gap will ionise in the final selector and connection will be established to the subscriber. Thus, although a test pulse is applied to line 47 in each group of 100 lines, it is only effective in that 100 line group in which a final selector has been connected to a marking potential.

YB conducts whatever the units digit, and the BY bus bar is raised to a positive potential. Coincidence of this condition with PBT pulse in time position 241 will connect this pulse to the busy tone gap in the final selector. Thus, if the subscriber is busy, the gap will not ionise in the final selector for connection to the subscriber and coincidence of PBT pulse with the selector marking condition will fire the busy tone gap and tone is returned to the subscriber. Obviously if the called subscriber was not busy, this pulse applied to the busy tone gap is ineffective.

Assume the number of the called subscriber was 1247 and that this line is the first line of a P.B.X group. Then again bus bar 47 is raised to a positive potential, a final selector is marked in this group of 100 lines, and PFT 187 will again, due to coincidence with the energisation of the bus bar 47, apply a test pulse to the first line of the P.B.X group. Four lines are shown comprising this group, of which pulse 187 tests the first line, 188 the second, 205 the third and 221 the last line. These pulses correspond to lines Nos. 47, 48, 65 and 81 illustrating that lines comprising a P.B.X group need not be consecutive. Also line 81 is a dead line used as a line of a P.B.X group. The lines are thus tested in turn when the PFT pulse arrives until a free line is found, when, as before, a gap is ionised in the selector and connection is established. If all lines are busy, then the PBT pulse in time position 241 will ionise the busy tone gap and tone is returned to the subscriber.

If a number is dialled other than that of the first line in the P.B.X group, then that line only is tested, there is no further testing, that is there is no P.B.X hunting. Thus if 1248 is dialled, bus bar 48 is raised in potential and coincidence of pulse PFT 188 (the pulse for line 48) with this condition will apply a test pulse to line 1248 and if the line is free the gap is fired. If busy the busy tone gap is fired.

It will be seen, therefore, that P.B.X lines, other than that representing the directory number, can be selected by signals representing either the directory number or that line's individual number. The exception to this is when a dead line is used as a P.B.X line. For example, line 1281 is a dead line used as a P.B.X line. If 1281 is dialled, bus bar 81 is raised in potential and coincidence of pulse PNT in time position 242 will fire the N.U. (number unobtainable) gap in the final selector and N.U. tone is returned to the subscriber. This feature of the system will in many cases permit a useful economy in lines.

At the end of pulses allocated to subscriber's lines (141 to 240) and those for busy tone (241) and N.U. tone (242) pulse PFR (243) will fire tubes RT and RU and these tubes firing will de-ionise any tens and units tubes and the circuit is ready for use in the next time cycle.

Group selector (Fig. 23)

This circuit is seized via an outlet of a preceding selector, the outlet test pulse from Fig. 19 being connected as shown. If the selector is busy the gap connecting it to the preceding selector is ionised, MR50' is conducting and the test pulse is ineffective due to the low resistance of this rectifier. If the circuit is free, MR50' presents a high resistance to the positive pulse, and coincidence of pulse and the marking potential of the selector will ionise the gap. Current flows, MR50' conducts, and relays H and AS operate in series. Of course, the relays AS and H belong to the selector stage preceding that including the multi-gap tubes shown in Fig. 23. The circuit of the next selector or the outgoing junction includes corresponding components as well as a transformer.

Prior to the operation of the H the selector marking potential was ineffective, since MR51 is biassed to its low resistance state when h1 is in the position shown. However, when H operates, h1 changes over, and, since MR52 is then in its high resistance state, this marking potential is connected via relay LSS to the common cathodes and the selector is prepared to select a free outlet to the next selector. Positive outlet test pulses are supplied as previously described. Coincidence of a test pulse with the marking potential will ionise a gap and, connection is established to the next selector or outgoing junction. The rectifier corresponding to MR52 for the selector tubes shown now conducts and assumes a low resistance, and the marking potential is rendered ineffective.

Relays AS and LSS are polarised relays, so arranged that on seizure, AS will operate to its "M" contact and that when a gap fires to complete the connection to the next stage, the currents in the windings of LSS relay are such that LSS maintains to its "S" contact. As described in the description of the final selector, when the called subscriber answers, the current in the winding of LSS connected to the anode will arise, the current in the other winding will remain substantially constant and LSS will operate to its "M" contact. Additional resistance in the other winding of relay AS is now inserted, the current flowing will be reduced but AS will remain on its "M" contact, and the current in the common anode of the preceding selector will rise. Thus, if this selector was preceded by a first selector then current through the anode winding of LS in this selector will increase, the cathode current again remaining substantially constant, and LS in the first selector will operate to its "M" contact. The "subscriber answer" condition is therefore recognised in the first selector, as previously mentioned. When the called subscriber clears, anode current of LSS in the group selector falls, LSS operates to its "S" contact, current rises in the AS relay and falls in the anode winding of LSS in the first selector and this relay operates to its "S" contact. Subscriber "answer" and "clear" signals are therefore repeated through the group selector.

If the group selector was seized from a first selector and in turn seized an outgoing junction to another exchange, then dialling by the subscriber will be detected by relay AS. In the first selector, as previously described, relay A follows dialled impulses and reduces the resistance in the anode circuit by introducing a shunt resistance across LS relay. Current will increase in the anode-cathode gap of this selector and will therefore decrease in the anode cathode gap connected to the group selector and relay AS in this circuit will release. AS will now operate to its "S" contact, additional resistance is inserted in the common cathode circuit, reducing the current in its commoned anode gap and also in the gap connected to the junction where, as described later, a relay releases. Dialled impulses are therefore repeated through the selector to the junction circuit where they are repeated to the distant exchange. When the calling subscriber clears, relay RR operates as described above, the gap in the first selector is de-ionised, and no current flows in relays AS and H which release. H in turn disconnects 200 v. from the cathode of the group selector, and because the reverse resistance of MR51 is such that the gap in the group selector will not maintain, it de-ionises and in turn succeeding circuits are released.

*Final selector (Fig. 24)*

Fig. 24 includes rectifier MR55, relay HH and resistor R40 which form the outlet connections of Fig. 23. The circuit of Fig. 24 is seized from a preceding group selector, and if it is free, coincidence of the test pulse applied to MR55, as shown, and the marking potential connected to the group selector will ionise a gap of that group selector. HH relay operates, MR55 conducts, and the circuit is busied. Rectifiers MR56, MR57 with HH operated are non-conducting to the marking potential so this condition is now applied to the common cathode and anode of the final selector. Gaps giving access to the A and B conductors of the line circuit are as disclosed in the co-pending application, Serial No. 347,486, referred to above, the gap connected to the "R" lead being part of a multi-diode tube having a common cathode and a plurality of anodes or an array of individual gas diodes of known types with a common connection to their cathodes.

In the description of the final selector control circuit (Figs. 20–22) the operation for applying test pulses to the subscriber's line has been described. If a called line is free, the gaps ionise and connection is established to the line circuit via A, B and R conductors. Rectifiers MR57 and MR56 conduct and the final selector is busied. Relay LC operates due to current flowing in the common cathode circuit but relay F will not operate in the commoned anode circuit. With reisstance R9 short circuited in the line circuit (Fig. 4) a high current flows in the cathode and individual anode gap to the line circuit and hence a low current flows in the common cathode and common anode gap. Thus relays F and D will not operate. Resistance R41 is short circuited via contacts *lc*1 and *f*1 by the ringing interrupters and relay R in the line circuit will operate to these interruptions and the subscriber will be rung. Ring tone with HH and LC relays operated is induced in the coupling transformer and tone returned to the calling subscriber.

When the subscriber answers L operates in the line circuit, resistance R9 is introduced into the final selector circuit, the current falls in the anode circuit to the subscriber and rises in the commoned anode circuit of the final selector. Relays F and D operate to this increase in current. F relay will remain operated via contact *f*2, and disconnects the ringing interrupters and ring tone at *f*1. D at *d*1 introduces resistance R40 into the anode circuit of the preceding selector, so the current in the commoned anode circuit of the preceding group selector increases and relay LSS in this circuit operates. The subscriber answer condition of relay D operated is thus transmitted to the preceding selector and as described above is repeated back to the first selector. If the subscriber is busy a pulse applied to rectifier MR58 fires a gap to which busy tone is connected and tone returned to the subscriber. Similarly N.U. tone is connected by a pulse applied to rectifier MR59 if the number dialled was to a dead line.

When the calling subscriber releases, HH is released due to the de-ionisation of the gap by the preceding selector and the gaps in the final selector are de-ionised since they will not sustain to the non-conductive condition of rectifier MR56. The selector is released and available for another call.

*Outgoing junction circuit (Fig. 26)*

This circuit is seized via an ionised gap from the preceding selector and for descriptive purposes it is assumed to be a group selector (Fig. 23). Relay HS operates when the connection is established via the ionised gaps and completes a loop circuit via MR60 and retard coil RT forward to the distant exchange. Relay AS in the group selector (Fig. 26) responds to dialled impulses, varies the common cathode current as described above and relay HS releases when the cathode current falls. HS therefore repeats the dialled impulses forward to the distant exchange by its contact *hs*1. HS also connects triggering potential by *hs*2 to tube STB which ionises, and de-ionises tube STC the function of which is described later. When the distant subscriber answers, relay DS operates via MR61 due to the reversal of potentials on the line in the usual manner. DS removes the short circuit across resistance R51 at *ds*1, and current therefore falls in the individual anode circuit to the selector and rises in the selector commoned anode circuit and LS relay in the group selector operates. This circuit then repeats the subscriber answer condition back to the first selector as already described. Relay HS releases when the calling subscriber releases due to de-ionisation of the selector gap as previously described. With HS released condenser CT charges slowly via R52 and after an interval tube STC fires and de-ionises STB. Until STC is fired the junction is busied since the outlet test pulse for ionising the selector gap connected to this circuit is only effective when STC is fired and its cathode has assumed a positive potential. Thus on release of a connection the junction circuit is busied for a time determined by the charging time of condenser CT in order to ensure the complete release of equipment in the distant exchange prior to re-seizure.

What we claim is:

1. A selector switch comprising two sets of three-electrode electronic devices capable of providing a low impedance, two-way, electrical path between first and second electrodes under control of a voltage condition applied to the third electrode, a first incoming lead multipled to the first electrodes of one set of devices, a second incoming lead multipled to the first electrodes of the other set of devices, separate outgoing leads connected individually to each second electrode of each set of devices, an inductive coupling across each pair of outgoing leads connected respectively to pairs of corresponding second electrodes of the two sets of devices, two connecting multiples, each interconnecting the third electrodes of a respective one of the two sets of devices, means for connecting a marking potential in common to both third electrode multiples, and means for connecting a marking potential of opposite sense to a single one of said inductive couplings at a time, whereby a single pair of three-electrode electronic devices, one from each of the two sets of devices, is fired by coincident marking potentials applied to their third electrodes and their second electrodes to provide a two-way, two-wire, transmission path between the first and second electrodes of a pair of said devices.

2. Selector equipment for a telecommunication exchange which comprises a group of selector switches divided into subgroups, a common multiple, a plurality of differently graded multiples, a common set of controls connected to all said selector switches via firstly said common multiple and secondly said plurality of differently graded multiples, one per sub-group, and current-blocking devices between the common multiple and each graded multiple to prevent interference.

3. A train of selector switches, each switch as claimed in claim 1, comprising a single inductive coupling between the two sets of three-electrode electronic devices in each switch, a switching-through relay connected to each inductive coupling and adapted to operate when the corresponding two-wire path is seized via the previous selector sets, and means responsive to the operation of said relay for applying marking potential to the third electrode of the succeeding sets.

4. A train of selector switches, as claimed in claim 3, and wherein the means for connecting the marking potential to a single one of the inductive couplings at a time comprises means for applying marking potential in turn to outlets of the first of said train of selectors for causing the completion of a two-wire transmission path via a pair of electronic devices of said selector and the consequent operation of its switching-through relay which in turn marks the third electrodes of the second of said train of selector switches, and wherein said marking-potential-connecting means further comprises means responsive to the completion of the path through the second of said train of selector switches for next applying said marking potential in turn to outlets of the second of said selectors for causing the extension of said two-wire transmission path to operate the switching-through relay of the next selector.

5. A train of selector switches, as claimed in claim 4, further comprising a source of electrical pulses, and means for controlling the sequence and timing of the switching operations at each selecting stage by a train of electrical pulses from said source.

6. A telecommunication exchange system comprising a plurality of stages of selector switches, each stage having a plurality of switches, each switch comprising two sets of three-electrode electronic devices capable of providing a low impedance, two-way, electrical path between first and second electrodes under control of a voltage condition applied to the third electrode, a first incoming lead multipled to the first electrodes of one set of devices, a second incoming lead multipled to the first electrodes of the other set of devices, separate outgoing leads connected individually to each second electrode of each set of devices, an inductive coupling across each pair of corresponding outgoing leads which are connected respectively to pairs of corresponding second electrodes of the two sets of devices and coupling said outgoing leads to the second incoming leads for the switch of the next succeeding stage, two connecting multiples, each interconnecting the third electrodes of a respective one of the two sets of devices, means for connecting a marking potential in common to both third electrode multiples, and means for connecting a marking potential of opposite coupling at a time, whereby a single pair of three-electrode electronic devices, one from each of the two sets of devices, is fired by coincident marking potentials applied to their third electrodes and their second electrodes to provide a two-way, two-wire, transmission path between the first and second electrodes of a pair of said devices, a single inductive coupling between the second incoming leads coupled to the inductive coupling across the outgoing leads of the switch in the preceding stage, a switching-through relay connected to the second-incoming-lead inductive coupling of each stage and adapted to operate when the two-wire path is completed through that stage by the firing of the associated sets of three-electrode devices, means responsive to the operation of said relay for applying marking potential to the third electrodes of the sets of electrodes in the switch of the succeeding stage, said means for applying marking potential to said third electrodes comprising a marking multiple which is common to all the switches of a stage, and means at each stage for ensuring exclusive temporary use of the marking multiple at that stage when a connection is being set up.

7. Telecommunication exchange system, as claimed in claim 6 and in which the individual pairs of outgoing leads from each selector switch are each connected to the respective common marking multiple via blocking unidirectional current carrying devices.

8. Telecommunication exchange system, as claimed in claim 6, further comprising a plurality of lines, means for producing successive time cycles, registers adapted to receive called party numbers from calling lines and to control the setting-up of connections through the stages of said selector switches, register connecting means responsive to calls on said lines for connecting-up said registers one at a time to said calling lines and responsive to the registers receiving called parties' numbers, for allocating one register at a time in successive of said time cycles for setting-up said connections.

9. Telecommunication exchange system, as claimed in claim 8, and in which a register and said marking-potential connecting means completely set up numerically controlled portion of each connection in a controlled time period.

10. A telecommunication exchange system, as claimed in claim 9, further comprising means for setting up waiting calls in turn in controlled time periods immediately succeeding one another.

11. A telecommunication exchange system, as claimed in claim 9, in which said controlled time period comprises a plurality of sub-periods, and further comprising means in the register marking-potential connecting means for causing one stage of connection to take place in each of said sub-periods.

12. A telecommunication exchange system as claimed in claim 11, further comprising means for setting up non-numerical connections in controlled time periods.

13. A telecommunication exchange system, as claimed in claim 12 in which the means for producing successive time periods comprises a pulse generator, means connected to said pulse generator for offering a train of pulses for each controlled time period to successive portions of the connecting equipment of the exchange, and means for controlling every step in each connecting operation by one or more pulses of the train of pulses.

14. A telecommunication exchange system, as claimed in claim 12, and in which the marking-potential-applying means includes means for alternately allocating times for operation of calling party connecting switches and called party connecting switches.

15. A telecommunication exchange system, as claimed in claim 6, further comprising means for giving priority of allocation to registers handling outgoing calls.

16. A telecommunication exchange system, as claimed in claim 15, further comprising outgoing junctions available to predetermined ones of the selectors, and means for releasing a register after it has caused an outgoing selector to seize an outgoing junction and to set up a direct dialling route from the calling line via the junction.

17. A telecommunication exchange system, as claimed in claim 6, further comprising an additional three-electrode device in each selector of each stage for the transmission of supervisory signals.

18. A telecommunication exchange system as claimed in claim 13 in which the means for controlling every step in each connecting operation comprises means for repeatedly connecting a respective train of impulses to the common multiple of each selector stage, one pulse for each outlet of the stage.

19. A telecommunication exchange system as claimed in claim 18, in which the means for repeatedly connecting a respective train of impulses to the common multiple of each selector stage connects said train of pulses repeatedly to each group of connecting switches in the exchange, one pulse for each one of a group of circuits, to one of which, connection is to be made by a switch.

20. A selector switch comprising a two-wire communication channel, two-wire outgoing communication channels connected to said switch, selection control test equipment connected to both of said first-mentioned wires, means in said test equipment responsive to signals received over both said first-mentioned wires, phantom circuits on said outgoing channels, a marking multiple connected to said phantom circuits, and a phantom test connection to the two-wire channel of said switch.

21. In a telecommunication system, a switch including a first and second gas-gap device each comprising pairs of first and second anodes and a common cathode, a first input lead connecting all the first anodes of the first device in multiple and a second input lead connecting all the first anodes of the second device in multiple, output channels, means including coupling elements for interconnecting each second anode of the first device to a respectively corresponding second anode of the second device and for coupling each interconnected set of second anodes to separate outgoing channels, control leads comprising a cathode lead interconnecting the common cathodes of the two devices and a group of selecting leads connected to respective coupling elements, and means for applying a potential to the said cathode lead and to the selecting lead corresponding to any selected channel for establishing a low impedance two-way electrical path between the two input leads and the selected channel through the gas-gap devices.

22. In a communication system as set forth in claim 21, registering and control means for registering called telephone numbers indicative of desired outgoing channels and for controlling the said potential-applying means to establish the said path to an outgoing channel indicated by the registered telephone number.

23. In a telecommunication system, a switch including a first and a second gas-gap device each comprising pairs of first and second anodes and a common cathode, calling and callable subscriber lines, means including coupling elements for interconnecting each first anode of the first device to a respectively corresponding first anode of the second device and for coupling each interconnected set of first anodes to a separate subscriber line, a group of output lead pairs each comprising a first output lead connecting all the second anodes of the first device in multiple and a second output lead connecting all the second anodes of the second device in multiple, control leads comprising a cathode lead interconnecting the common cathodes of the two devices and a group of selecting leads connected to the respective coupling elements, and means for applying potentials to the said cathode lead and to the selection-controlling lead associated with any selected line for establishing a low-impedance two-way electrical path between the selected line and the two output leads through the gas-gap devices.

24. In a telecommunication system according to claim 23, a non-numerical group and a numerical group of said switches for establishing paths from calling subscriber lines to any idle output pair and for establishing paths from any output pair to called subscriber lines, respectively, apparatus common to both groups of switches, means controlled by a calling line for operating the common apparatus to control the potential-applying means to establish the said path through a switch in the non-numerical group, and means responsive to the calling of any desired subscriber line for operating the common apparatus to control the potential-applying means to establish the said path through a switch of the numerical group.

References Cited in the file of this patent

UNITED STATES PATENTS

| | | |
|---|---|---|
| 1,271,337 | Lundell | July 2, 1918 |
| 1,545,025 | Anspach | July 7, 1925 |
| 2,413,440 | Farrington | Dec. 31, 1946 |
| 2,582,959 | Bruce et al. | Jan. 22, 1952 |
| 2,589,697 | Hullegard | Mar. 18, 1952 |
| 2,598,392 | Kaell et al. | May 27, 1952 |
| 2,651,678 | Edwards et al. | Sept. 8, 1953 |
| 2,684,405 | Bruce et al. | July 20, 1954 |
| 2,686,839 | den Hertog | Aug. 17, 1954 |
| 2,688,661 | van Mierlo | Sept. 7, 1954 |
| 2,734,946 | Mercer | Feb. 14, 1956 |
| 2,761,012 | Murray et al. | Aug. 28, 1956 |
| 2,766,327 | Lesti | Oct. 9, 1956 |
| 2,774,820 | Bray et al. | Dec. 18, 1956 |